US012807819B2

(12) United States Patent
Jakob et al.

(10) Patent No.: US 12,807,819 B2
(45) Date of Patent: Nov. 24, 2026

(54) MICA PARTICULATES

(71) Applicant: IMERTECH SAS, Paris (FR)

(72) Inventors: Alexandra Jakob, Toulouse (FR); Théodore Ineich, Toulouse (FR)

(73) Assignee: ImerTech SAS, Paris (FR)

( * ) Notice: Subject to any disclaimer, the term of this patent is extended or adjusted under 35 U.S.C. 154(b) by 224 days.

(21) Appl. No.: 18/557,240

(22) PCT Filed: Apr. 27, 2022

(86) PCT No.: PCT/EP2022/061205
§ 371 (c)(1),
(2) Date: Oct. 25, 2023

(87) PCT Pub. No.: WO2022/229259
PCT Pub. Date: Nov. 3, 2022

(65) Prior Publication Data

US 2024/0209212 A1 Jun. 27, 2024

(30) Foreign Application Priority Data

Apr. 27, 2021 (EP) .................................... 21305542

(51) Int. Cl.
*C09C 1/40* (2006.01)
*C08J 3/22* (2006.01)
*C08K 3/34* (2006.01)

(52) U.S. Cl.
CPC ................. *C09C 1/405* (2013.01); *C08J 3/22* (2013.01); *C08K 3/34* (2013.01); *C01P 2004/61* (2013.01); *C01P 2006/12* (2013.01); *C08J 2323/12* (2013.01); *C08K 2201/006* (2013.01)

(58) Field of Classification Search
CPC ........... C08J 3/22; C08J 2323/12; C08K 3/34; C08K 2201/006; C08K 3/346; C08K 2201/003; C09C 1/405; C09C 1/0018; C09C 2200/102; C01P 2004/61; C01P 2006/12; C01P 2004/51; C01P 2004/54; C01P 2004/60
See application file for complete search history.

(56) References Cited

U.S. PATENT DOCUMENTS

| | | | | |
|---|---|---|---|---|
| 4,229,504 | A | 10/1980 | Brachman | |
| 4,283,326 | A | 8/1981 | Charles et al. | |
| 4,291,084 | A | 9/1981 | Segal | |
| 4,467,077 | A | 8/1984 | Meyer et al. | |
| 4,501,843 | A | 2/1985 | Needham | |
| 5,286,776 | A | 2/1994 | Ichikawa et al. | |
| 5,576,617 | A | 11/1996 | Webb et al. | |
| 6,274,248 | B1 | 8/2001 | Goto et al. | |
| 6,348,536 | B1 * | 2/2002 | Fourty | C09C 3/041 524/451 |
| 2002/0161094 | A1 | 10/2002 | Miller, III et al. | |

FOREIGN PATENT DOCUMENTS

| | | | | |
|---|---|---|---|---|
| CA | 2848817 | C | 10/2017 | |
| CN | 106795320 | A | 5/2017 | |
| CN | 110691812 | A | 1/2020 | |
| EP | 0365968 | A1 | 5/1990 | |
| EP | 0971988 | B1 * | 7/2002 | C09C 1/42 |
| EP | 2216350 | B1 | 4/2012 | |
| EP | 3778770 | A1 | 2/2021 | |
| EP | 3868357 | A1 | 8/2021 | |
| WO | 2009057131 | A2 | 5/2009 | |
| WO | 2013015841 | A2 | 1/2013 | |
| WO | 2015100211 | A1 | 7/2015 | |
| WO | 2018185180 | A1 | 10/2018 | |
| WO | WO-2018187638 | A1 * | 10/2018 | C08K 3/346 |

OTHER PUBLICATIONS

International Search Report and Written Opinion mailed Aug. 26, 2022, in International Application No. PCT/EP2022/061205 (13 pages).
Baudet & Rona, "Comparison of methods of granulometric analysis, application of laser granulometer for the determination of particulate shape coefficient" Ind Min Mines et Carr. Les Techn. June, Jul. 1990, pp. 55-61. (Machine translation attached, 16 pages).
Dumas et al., "Fast-Geomimicking using Chemistry in Supercritical Water," Angewandte Chemie International Edition 2016, 55, 9868-9871.
Chinese Office Action for CN 202280045229X dated Aug. 25, 2026 (24 pages).

* cited by examiner

*Primary Examiner* — Anthony J Green
(74) *Attorney, Agent, or Firm* — Finnegan, Henderson, Farabow, Garrett & Dunner, LLP

(57) ABSTRACT

A mica particulate has: (a) a BET specific surface area no less than about 4.5 $m^2/g$; and (b) a lamellarity index no less than about 2.5. A method for preparing the mica particulate comprises classifying a ground mica material, such as a wet ground mica material.

13 Claims, 1 Drawing Sheet

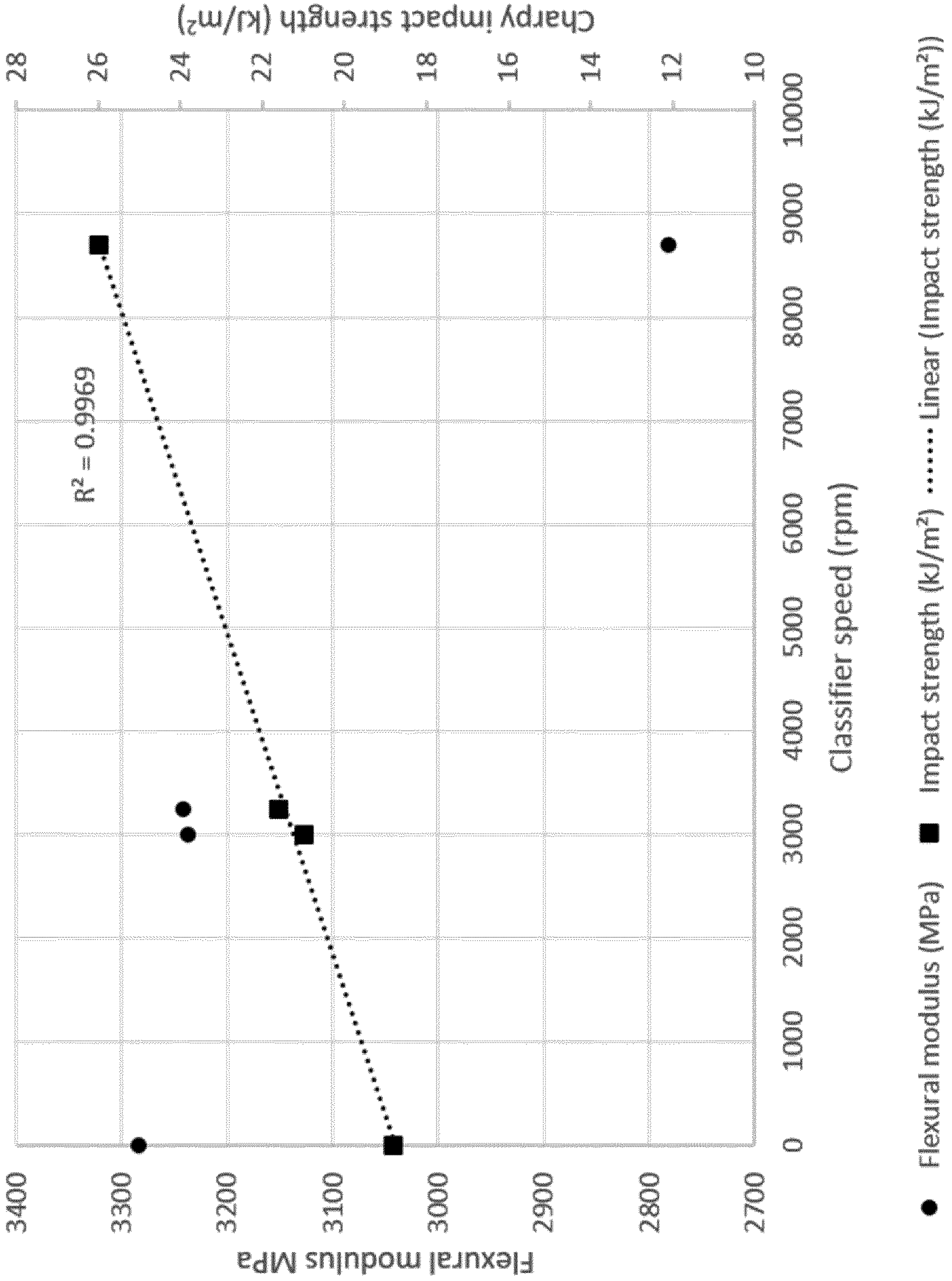
Charpy impact strength (kJ/m²)
28
26
24
22
20
18
16
14
12
10
Flexural modulus MPa
3400
3300
3200
3100
3000
2900
2800
2700
0
1000
2000
3000
4000
5000
6000
7000
8000
9000
10000
Classifier speed (rpm)
R² = 0.9969
Flexural modulus (MPa)
Impact strength (kJ/m²)
Linear (Impact strength (kJ/m²))

MICA PARTICULATES

CLAIM FOR PRIORITY

This application is a U.S. national phase entry under 35 U.S.C. § 371 from PCT International Application No. PCT/EP2022/061205, filed Apr. 27, 2022, which claims the benefit of priority of European Patent Application No. 21305542.9, filed Apr. 27, 2021, from all of which this application claims priority and all of which are incorporated herein by reference.

TECHNICAL FIELD

The present disclosure concerns mica particulates, methods for preparing mica particulates, polymer compositions comprising mica particulates, methods of making polymer compositions comprising mica particulates, articles formed from polymer compositions comprising mica particulates, and associated uses of, and methods of using, mica particulates in polymer compositions.

BACKGROUND

Polymer compositions are commonly reinforced with filler materials. Mica and talc are examples of filler materials used to reinforce polymer compositions, such as thermoplastic polymer compositions, including polyolefins and/or polyamides. Such filler materials are used to improve properties such as the impact strength of the polymer composition. However, further improvements in impact strength would be desirable. Improvements in other mechanical properties (such as flexural modulus) of filled polymer compositions would also be desirable.

SUMMARY

According to a first aspect, a mica particulate has: (a) a BET specific surface area no less than about 4.5 $m^2/g$; and (b) a lamellarity index no less than about 2.5.

According to a second aspect, a method for preparing the mica particulate according to the first aspect comprises classifying a ground mica material, such as a wet ground mica material.

According to a third aspect, a polymer composition comprises the mica particulate according to the first aspect.

According to a fourth aspect, a method of making the polymer composition according to the third aspect comprises combining a polymer or polymer precursors with the mica particulate according to the first aspect.

According to a fifth aspect, there is provided an article formed from the polymer composition according to the third aspect.

According to a sixth aspect, there is provided a use of the mica particulate according to the first aspect in a polymer composition to increase the impact strength of the polymer composition.

According to a seventh aspect, there is provided a method of increasing the impact strength of a polymer composition, the method comprising adding the mica particulate according to the first aspect to the polymer composition.

The skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

FIGURES

Embodiments will now be described by way of example only, with reference to the FIGURES, in which:

FIG. 1 is a plot of flexural modulus and Charpy impact strength for four different polypropylene compositions, each filled with a different mica particulate, as a function of the classifier speed used in the preparing of the respective mica particulates.

DETAILED DESCRIPTION OF THE INVENTION

It has surprisingly been found that a mica particulate combining a relatively high BET specific surface area with a relatively high lamellarity index is particularly effective at increasing the impact strength of polymer compositions such as thermoplastic polymer compositions.

Mica Particulate

As used herein, the term "mica" refers to the mica group of hydrated phyllosilicate minerals. The mica group includes the following:

biotite (i.e. $K(Mg,Fe)_3(AlSi_3)O_{10}(OH)_2$);
fuchsite (i.e. $K(Al,Cr)_2(AlSi_3)O_{10}(OH)_2$);
muscovite (i.e. $KAl_2(AlSi_3)O_{10}(OH)_2$);
phlogopite (i.e. $KMg_3(AlSi_3)O_{10}(OH)_2$);
lepidolite (i.e. $K(Li,Al)_{2-3}(AlSi_3)O_{10}(OH)_2$);
margarite (i.e. $CaAl2(Al2Si2)O_{10}(OH)_2$); and
glauconite (i.e. $(K,Na)(Al,Mg,Fe)_2(Si,Al)_4O_{10}(OH)_2$).

The mica particulate may comprise a single mica group mineral or a mixture of different mica group minerals. For example, the mica particulate may comprise (i.e. only) one of biotite, fuchsite, muscovite, phlogopite, lepidolite, margarite, and glauconite. Alternatively, the mica particulate may comprise two or more of biotite, fuchsite, muscovite, phlogopite, lepidolite, margarite, and glauconite.

The mica particulate may consist essentially of, or consist of, mica group mineral(s). Alternatively, the mica particulate may further comprise one or more non-mica group minerals.

The one or more non-mica group minerals may comprise (e.g. be) non-mica group phyllosilicate minerals such as serpentine group or clay group phyllosilicate minerals. The one or more non-mica group phyllosilicate minerals may comprise (e.g. be) talc (i.e. the magnesium silicate mineral ($Mg_3Si_4O_{10}(OH)_2$)), chlorite (i.e. $(Mg,Fe)_3(Si,Al)_4O_{10}(OH)_2\cdot(Mg,Fe)_3(OH)_6$) and/or kaolinite (i.e. $Al_2Si_2O_5(OH)_4$). Additionally or alternatively, the one or more non-mica group minerals may comprise (e.g. be) non-phyllosilicate minerals such as dolomite, magnesite, feldspar, or quartz.

The total amount of non-mica group minerals may be less than about 25 wt. %, for example, less than about 20 wt. %, or less than about 15 wt. %, or less than about 10 wt. %, or less than about 5 wt. %, or less than about 1 wt. %, or less than about 0.5 wt. %, or less than about 0.1 wt. %, based on the total weight of the mica particulate.

It may be that the mica particulate comprises no less than about 75 wt. % mica (i.e. mica group minerals), for example, no less than about 80 wt. %, or no less than about 90 wt. %, or no less than about 95 wt. %, or no less than about 99 wt. %, or no less than about 99.9 wt. %, mica (i.e. mica group minerals), based on the total weight of the mica particulate. It may be that the mica particulate consists essentially of, or consists of, mica (i.e. mica group minerals).

It may be that the majority of the mica (i.e. mica group minerals) present in the mica particulate is muscovite. The mica (i.e. mica group minerals) present in the mica particulate may comprise no less than about 50 wt. %, for example, no less than about 60 wt. %, or no less than about 70 wt. %, or no less than about 80 wt. %, or no less than about 90 wt. %, or no less than about 95 wt. %, or no less than about 99 wt. %, for example, about 100 wt. %, of muscovite, based on the total weight of the mica (i.e. mica group minerals) present in the mica particulate. The mica (i.e. mica group minerals) in the mica particulate may consist essentially of, or consist of, muscovite.

It may be that the majority of the mica particulate is muscovite. The mica particulate may comprise no less than about 50 wt. %, for example, no less than about 60 wt. %, or no less than about 70 wt. %, or no less than about 80 wt. %, or no less than about 90 wt. %, or no less than about 95 wt. %, or no less than about 99 wt. %, for example, about 100 wt. %, muscovite, based on the total weight of the mica particulate. The mica particulate may consist essentially of, or consist of, muscovite. The mica particulate may be a muscovite particulate.

The composition of the mica particulate may be determined using semi-quantitative powder X-ray diffraction (XRD). For example, the intensity of the kaolinite peak at around 2θ=12.1° may be compared to the intensity of the mica main peak at around 2θ=9.0° to determine the relative amounts of kaolinite and mica present in a sample. The XRD measurements may be obtained by the following method. A sample of the mica particulate is milled to a particle size (by sedigraph) of less than 10 μm. A lump-free powder is generated and inserted into an XRD sample holder by back filling, using a suitable method to ensure that preferential orientation is avoided. The sample is scanned on the XRD (either a Malvern Panalytical X'Pert PRO or a D8 Advance A25 Bruker with Bragg-Brentano Geometry and K430 X-ray generator) at 40 mA and 40 eV between 2θ=5° and 2θ=60° using a step size of 0.02° and 10 seconds per step. The scan is viewed on the XRD analysis software HighScore Plus (available from Malvern Panalytical) or DIFFRAC.EVA (available from Bruker) and XRD peaks are assigned according to the PDF-2 minerals database (available from the International Centre for Diffraction Data). XRD peak information is also available from public databases (such as the Mineralogy Database at http://webmineral.com). The amount of each mineral in the sample is determined from the corresponding XRD peak heights by the Reference Intensity Ratio (RIR) method.

BET specific surface area refers to the area of the surface of the particles of the mica particulate with respect to unit mass, determined according to the BET method by the quantity of nitrogen adsorbed on the surface of said particles so as to form a monomolecular layer completely covering said surface (measurement according to the BET method, AFNOR standard X11-621 and 622 or ISO 9277). Details of the BET specific surface area measurement method used in the preparation of the present application are set out in the Examples.

The mica particulate may have a BET specific surface area no less than about 4.5 $m^2/g$, for example, no less than about 4.6 $m^2/g$, or no less than about 4.7 $m^2/g$, or no less than about 4.8 $m^2/g$, or no less than about 4.9 $m^2/g$, or no less than about 5.0 $m^2/g$, or no less than about 5.1 $m^2/g$, or no less than about 5.2 $m^2/g$, or no less than about 6.0 $m^2/g$, or no less than about 7.0 $m^2/g$, or no less than about 8.0 $m^2/g$, or no less than about 9.0 $m^2/g$, or no less than about 10 $m^2/g$ (e.g. 10.0 $m^2/g$), or no less than about 11 $m^2/g$ (e.g. 11.0 $m^2/g$). The mica particulate may have a BET specific surface area no greater than about 50 $m^2/g$ (e.g. 50.0 $m^2/g$), for example, no greater than about 40 $m^2/g$ (e.g. 40.0 $m^2/g$), or no greater than about 30 $m^2/g$, (e.g. 30.0 $m^2/g$) or no greater than about 20 $m^2/g$ (e.g. 20.0 $m^2/g$), or no greater than about 15 $m^2/g$ (e.g. 15.0 $m^2/g$), or no greater than about 12 $m^2/g$ (e.g. 12.0 $m^2/g$), or no greater than about 11 $m^2/g$ (e.g. 11.0 $m^2/g$), or no greater than about 10 $m^2/g$ (e.g. 10.0 $m^2/g$), or no greater than about 8.0 $m^2/g$, or no greater than about 7.0 $m^2/g$, or no greater than about 6.0 $m^2/g$. The mica particulate may have a BET specific surface area may be from about 4.6 $m^2/g$ to about 50 $m^2/g$ (e.g. 50.0 $m^2/g$), for example, from about 4.6 $m^2/g$ to about 40 $m^2/g$ (e.g. 40.0 $m^2/g$), or from about 4.6 $m^2/g$ to about 30 $m^2/g$ (e.g. 30.0 $m^2/g$), or from about 4.6 $m^2/g$ to about 20 $m^2/g$ (e.g. 20.0 $m^2/g$), or from about 4.6 $m^2/g$ to about 15 $m^2/g$ (e.g. 15.0 $m^2/g$), or from about 4.6 $m^2/g$ to about 12 $m^2/g$ (e.g. 12.0 $m^2/g$), or from about 4.6 $m^2/g$ to about 11 $m^2/g$ (e.g. 11.0 $m^2/g$), or from about 4.6 $m^2/g$ to about 10 $m^2/g$ (e.g. 10.0 $m^2/g$), or from about 4.6 $m^2/g$ to about 8.0 $m^2/g$, or from about 4.6 $m^2/g$ to about 7.0 $m^2/g$, or from about 4.6 $m^2/g$ to about 6.0 $m^2/g$, or from about 4.7 $m^2/g$ to about 50 $m^2/g$ (e.g. 50.0 $m^2/g$), or from about 4.7 $m^2/g$ to about 40 $m^2/g$ (e.g. 40.0 $m^2/g$), or from about 4.7 $m^2/g$ to about 30 $m^2/g$ (e.g. 30.0 $m^2/g$), or from about 4.7 $m^2/g$ to about 20 $m^2/g$ (e.g. 20.0 $m^2/g$), or from about 4.7 $m^2/g$ to about 15 $m^2/g$ (e.g. 15.0 $m^2/g$), or from about 4.7 $m^2/g$ to about 12 $m^2/g$ (e.g. 12.0 $m^2/g$), or from about 4.7 $m^2/g$ to about 11 $m^2/g$ (e.g. 11.0 $m^2/g$), or from about 4.7 $m^2/g$ to about 10 $m^2/g$ (e.g. 10.0 $m^2/g$), or from about 4.7 $m^2/g$ to about 8.0 $m^2/g$, or from about 4.7 $m^2/g$ to about 7.0 $m^2/g$, or from about 4.7 $m^2/g$ to about 6.0 $m^2/g$, or from about 4.8 $m^2/g$ to about 50 $m^2/g$ (e.g. 50.0 $m^2/g$), or from about 4.8 $m^2/g$ to about 40 $m^2/g$ (e.g. 40.0 $m^2/g$), or from about 4.8 $m^2/g$ to about 30 $m^2/g$ (e.g. 30.0 $m^2/g$), or from about 4.8 $m^2/g$ to about 20 $m^2/g$ (e.g. 20.0 $m^2/g$), or from about 4.8 $m^2/g$ to about 15 $m^2/g$ (e.g. 15.0 $m^2/g$), or from about 4.8 $m^2/g$ to about 12 $m^2/g$ (e.g. 12.0 $m^2/g$), or from about 4.8 $m^2/g$ to about 11 $m^2/g$ (e.g. 11.0 $m^2/g$), or from about 4.8 $m^2/g$ to about 10 $m^2/g$ (e.g. 10.0 $m^2/g$), or from about 4.8 $m^2/g$ to about 8.0 $m^2/g$, or from about 4.8 $m^2/g$ to about 7.0 $m^2/g$, or from about 4.8 $m^2/g$ to about 6.0 $m^2/g$, or from about 4.9 $m^2/g$ to about 50 $m^2/g$ (e.g. 50.0 $m^2/g$), or from about 4.9 $m^2/g$ to about 40 $m^2/g$ (e.g. 40.0 $m^2/g$), or from about 4.9 $m^2/g$ to about 30 $m^2/g$ (e.g. 30.0 $m^2/g$), or from about 4.9 $m^2/g$ to about 20 $m^2/g$ (e.g. 20.0 $m^2/g$), or from about 4.9 $m^2/g$ to about 15 $m^2/g$ (e.g. 15.0 $m^2/g$), or from about 4.9 $m^2/g$ to about 12 $m^2/g$ (e.g. 12.0 $m^2/g$), or from about 4.9 $m^2/g$ to about 11 $m^2/g$ (e.g. 11.0 $m^2/g$), or from about 4.9 $m^2/g$ to about 10 $m^2/g$ (e.g. 10.0 $m^2/g$), or from about 4.9 $m^2/g$ to about 8.0 $m^2/g$, or from about 4.9 $m^2/g$ to about 7.0 $m^2/g$, or from about 4.9 $m^2/g$ to about 6.0 $m^2/g$, or from about 5.0 $m^2/g$ to about 50 $m^2/g$ (e.g. 50.0 $m^2/g$), or from about 5.0 $m^2/g$ to about 40 $m^2/g$ (e.g. 40.0 $m^2/g$), or from about 5.0 $m^2/g$ to about 30 $m^2/g$ (e.g. 30.0 $m^2/g$), or from about 5.0 $m^2/g$ to about 20 $m^2/g$ (e.g. 20.0 $m^2/g$), or from about 5.0 $m^2/g$ to about 15 $m^2/g$ (e.g. 15.0 $m^2/g$), or from about 5.0 $m^2/g$ to about 12 $m^2/g$ (e.g. 12.0 $m^2/g$), or from about 5.0 $m^2/g$ to about 11 $m^2/g$ (e.g. 11.0 $m^2/g$), or from about 5.0 $m^2/g$ to about 10 $m^2/g$ (e.g. 10.0 $m^2/g$), or from about 5.0 $m^2/g$ to about 8.0 $m^2/g$, or from about 5.0 $m^2/g$ to about 7.0 $m^2/g$, or from about 5.0 $m^2/g$ to about 6.0 $m^2/g$, or from about 5.1 $m^2/g$ to about 50 $m^2/g$ (e.g. 50.0 $m^2/g$), or from about 5.1 $m^2/g$ to about 40 $m^2/g$ (e.g. 40.0 $m^2/g$), or from about 5.1 $m^2/g$ to about 30 $m^2/g$ (e.g. 30.0 $m^2/g$), or from about 5.1 $m^2/g$ to about 20 $m^2/g$ (e.g. 20.0 $m^2/g$), or from about 5.1 $m^2/g$ to about 15 $m^2/g$ (e.g. 15.0 $m^2/g$), or from about 5.1 $m^2/g$ to about 12 $m^2/g$ (e.g. 12.0 $m^2/g$), or from about 5.1 $m^2/g$ to about 11 $m^2/g$ (e.g. 11.0 $m^2/g$), or from about 5.1 $m^2/g$ to about 10 $m^2/g$ (e.g. 10.0 $m^2/g$), or from about 5.1 $m^2/g$ to about 8.0 $m^2/g$, or from about 5.1 $m^2/g$ to about 7.0 $m^2/g$, or from about 5.1 $m^2/g$ to about 6.0 $m^2/g$, or from about 5.2 $m^2/g$ to about 50 $m^2/g$ (e.g. 50.0 $m^2/g$), or from about 5.2 $m^2/g$ to about 40 $m^2/g$ (e.g. 40.0 $m^2/g$), or from about 5.2 $m^2/g$ to about 30 $m^2/g$ (e.g. 30.0 $m^2/g$), or from about 5.2 $m^2/g$ to about 20 $m^2/g$ (e.g. 20.0 $m^2/g$), or from about 5.2 $m^2/g$ to about 15 $m^2/g$ (e.g. 15.0 $m^2/g$), or from about 5.2 $m^2/g$ to about 12 $m^2/g$ (e.g. 12.0 $m^2/g$), or from about 5.2 $m^2/g$ to about 11 $m^2/g$ (e.g. 11.0 $m^2/g$), or from about 5.2 $m^2/g$ to about 10 $m^2/g$ (e.g. 10.0 $m^2/g$), or from about 5.2 $m^2/g$ to about 8.0 $m^2/g$, or from about 5.2 $m^2/g$ to about 7.0 $m^2/g$, or from about 5.2 $m^2/g$ to about 6.0 $m^2/g$, or from about 6.0 $m^2/g$ to about 50 $m^2/g$ (e.g. 50.0 $m^2/g$), or from about 6.0 $m^2/g$ to about 40 $m^2/g$ (e.g. 40.0 $m^2/g$), or from about 6.0 $m^2/g$ to about 30 $m^2/g$ (e.g. 30.0 $m^2/g$), or from about 6.0 $m^2/g$ to about 20 $m^2/g$ (e.g. 20.0 $m^2/g$), or from about 6.0 $m^2/g$ to about 15 $m^2/g$ (e.g. 15.0 $m^2/g$), or from about 6.0 $m^2/g$ to about 12 $m^2/g$ (e.g. 12.0 $m^2/g$), or from about 6.0 $m^2/g$ to about 11 $m^2/g$ (e.g. 11.0 $m^2/g$), or from about 6.0 $m^2/g$ to about 10 $m^2/g$ (e.g. 10.0 $m^2/g$), or from about 6.0 $m^2/g$ to about 8.0 $m^2/g$, or from about 6.0 $m^2/g$ to about 7.0 $m^2/g$, or from about 7.0 $m^2/g$ to about 50 $m^2/g$ (e.g. 50.0 $m^2/g$), or from about 7.0 $m^2/g$ to about 40 $m^2/g$ (e.g. 40.0 $m^2/g$), or from about 7.0 $m^2/g$ to about 30 $m^2/g$ (e.g. 30.0 $m^2/g$), or from about 7.0 $m^2/g$ to about 20 $m^2/g$ (e.g. 20.0 $m^2/g$), or from about 7.0 $m^2/g$ to about 15 $m^2/g$ (e.g. 15.0 $m^2/g$), or from about 7.0 $m^2/g$ to about 12 $m^2/g$ (e.g. 12.0 $m^2/g$), or from about 7.0 $m^2/g$ to about 11 $m^2/g$ (e.g. 11.0 $m^2/g$), or from about 7.0 $m^2/g$ to about 10 $m^2/g$ (e.g. 10.0 $m^2/g$), or from about 7.0 $m^2/g$ to about 8.0 $m^2/g$, or from about 8.0 $m^2/g$ to about 50 $m^2/g$ (e.g. 50.0 $m^2/g$), or from about 8.0 $m^2/g$ to about 40 $m^2/g$ (e.g. 40.0 $m^2/g$), or from about 8.0 $m^2/g$ to about 30 $m^2/g$ (e.g. 30.0 $m^2/g$), or from about 8.0 $m^2/g$ to about 20 $m^2/g$ (e.g. 20.0 $m^2/g$), or from about 8.0 $m^2/g$ to about 15 $m^2/g$ (e.g. 15.0 $m^2/g$), or from about 8.0 $m^2/g$ to about 12 $m^2/g$ (e.g. 12.0 $m^2/g$), or from about 8.0 $m^2/g$ to about 11 $m^2/g$ (e.g. 11.0 $m^2/g$), or from about 8.0 $m^2/g$ to about 10 $m^2/g$ (e.g. 10.0 $m^2/g$), or from about 9.0 $m^2/g$ to about 50 $m^2/g$ (e.g. 50.0 $m^2/g$), or from about 9.0 $m^2/g$ to about 40 $m^2/g$ (e.g. 40.0 $m^2/g$), or from about 9.0 $m^2/g$ to about 30 $m^2/g$ (e.g. 30.0 $m^2/g$), or from about 9.0 $m^2/g$ to about 20 $m^2/g$ (e.g. 20.0 $m^2/g$), or from about 9.0 $m^2/g$ to about 15 $m^2/g$ (e.g. 15.0 $m^2/g$), or from about 9.0 $m^2/g$ to about 12 $m^2/g$ (e.g. 12.0 $m^2/g$), or from about 10 $m^2/g$ (e.g. 10.0 $m^2/g$) to about 50 $m^2/g$ (e.g. 50.0 $m^2/g$), or from about 10 $m^2/g$ (e.g. 10.0 $m^2/g$) to about 40 $m^2/g$ (e.g. 40.0 $m^2/g$), or from about 10 $m^2/g$ (e.g. 10.0 $m^2/g$) to about 30 $m^2/g$ (e.g. 30.0 $m^2/g$), or from about 10 $m^2/g$ (e.g. 10.0 $m^2/g$) to about 20 $m^2/g$ (e.g. 20.0 $m^2/g$), or from about 10 $m^2/g$ (e.g. 10.0 $m^2/g$) to about 15 $m^2/g$ (e.g. 15.0 $m^2/g$), or from about 10 $m^2/g$ (e.g. 10.0 $m^2/g$) to about 12 $m^2/g$ (e.g. 12.0 $m^2/g$), or from about 11 $m^2/g$ (e.g. 11.0 $m^2/g$) to about 50 $m^2/g$ (e.g. 50.0 $m^2/g$), or from about 11 $m^2/g$ (e.g. 11.0 $m^2/g$) to about 40 $m^2/g$ (e.g. 40.0 $m^2/g$), or from about 11 $m^2/g$ (e.g. 11.0 $m^2/g$) to about 30 $m^2/g$ (e.g. 30.0 $m^2/g$), or from about 11 $m^2/g$ (e.g. 11.0 $m^2/g$) to about 20 $m^2/g$ (e.g. 20.0 $m^2/g$), or from about 11 $m^2/g$ (e.g. 11.0 $m^2/g$) to about 15 $m^2/g$ (e.g. 15.0 $m^2/g$), or from about 11 $m^2/g$ (e.g. 11.0 $m^2/g$) to about 12 $m^2/g$ (e.g. 12.0 $m^2/g$).

It has been found that mica having a high BET specific surface area (e.g. no less than about 4.5 $m^2/g$, or preferably no less than about 5.0 $m^2/g$, or more preferably no less than about 10.0 $m^2/g$) tends to increase the impact strength of polymer compositions into which it is incorporated.

It has been found that mica having a BET specific surface area from about 4.5 $m^2/g$ to about 15 $m^2/g$, or preferably from about 4.5 $m^2/g$ to about 10 $m^2/g$, or more preferably from about 5.0 $m^2/g$ to about 10 $m^2/g$, for example about 5.0 $m^2/g$, achieves a good balance between high impact strength and high flexural modulus of polymer compositions into which the mica is incorporated.

Particle size properties may be measured in a well-known manner by sedimentation of the particulate filler or material in a fully dispersed condition in an aqueous medium using a Sedigraph 5100 machine as supplied by Micromeritics Instruments Corporation, Norcross, Georgia, USA (website: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The $d_{98}$, $d_{95}$, $d_{90}$, $d_{75}$, $d_{25}$ and the $d_{10}$ are the values determined in this way of the particle e.s.d. at which there are 98%, 95%, 90%, 75%, 25% and 10% respectively by weight of the particles which have an equivalent spherical diameter less than that $d_{98}$, $d_{95}$, $d_{90}$, $d_{75}$, $d_{25}$ or $d_{10}$ value.

Particle size properties may also be measured by wet Malvern laser scattering (standard ISO 13320-1). In this technique, the size of particles in powders, suspensions and emulsions may be measured using the diffraction of a laser beam, based on the application of Mie theory. Such a machine, for example a Malvern Mastersizer S or a Malvern Mastersizer 2000 (as supplied by Malvern instruments), provides measurements and a plot of the cumulative percentage by volume of particles having a size, referred to in the art as the "equivalent spherical diameter" (e.s.d), less than given e.s.d values. The mean particle size $d_{50}$ is the value determined in this way of the particle e.s.d. at which there are 50% by volume of the particles which have an equivalent spherical diameter less than that $d_{50}$ value. The $d_{98}$, $d_{95}$, $d_{90}$, $d_{75}$, $d_{25}$ and the $d_{10}$ are the values determined in this way of the particle e.s.d. at which there are 98%, 95%, 90%, 75%, 25% and 10% respectively by volume of the particles which have an equivalent spherical diameter less than that $d_{98}$, $d_{95}$, $d_{90}$, $d_{75}$, $d_{25}$ or $d_{10}$ value. For the avoidance of doubt, the measurement of particle size using laser light scattering is not an equivalent method to the sedimentation method referred to above.

Details of the sedigraphic and laser particle size measurement methods used in the preparation of the present application are set out in the Examples.

Lamellarity index (LI) is a measure of overall particle shape. Lamellarity index is defined by the following ratio:

$$LI = \frac{d_{50}^{laser} - d_{50}^{sedi}}{d_{50}^{sedi}}$$

in which "$d_{50}^{laser}$" is the value of the mean particle size ($d_{50}$) measured by laser diffraction (standard NFX-11-666 or ISO 13320-1) and "$d_{50}^{sedi}$" is the value of the median diameter obtained by sedimentation using a sedigraph (standard Afnor-X-11-683 or ISO 13317-3), as described above and in the Examples. Reference may be made to the article by G.

Baudet and J. P. Rona, Ind. Min. Mines et Carr. Les techn. June, July 1990, pp 55-61, which shows that the lamellarity index is correlated to the mean ratio of the largest dimension of a particle to its smallest dimension.

The mica particulate may have a lamellarity index no less than about 2.5, for example, no less than about 2.6, or no less than about 3.0, or no less than about 3.1, or no less than about 3.2, or no less than about 3.3, or no less than about 3.4, or no less than about 3.5, or no less than about 4.0, or no less than about 4.1, or no less than about 4.5, or no less than about 5.0. The mica particulate may have a lamellarity index no greater than about 9.0, for example, no greater than about 7.0, or no greater than about 6.5, or no greater than about 6.0, or no greater than about 5.9, or no greater than about 5.8, or no greater than about 5.7, or no greater than about 5.5, or no greater than about 5.1, or no greater than about 5.0, or no greater than about 4.2, or no greater than about 4.1, or no greater than about 4.0. The mica particulate may have a lamellarity index from about 2.5 to about 9.0, for example, from about 2.5 to about 7.0, or from about 2.5 to about 6.5, or from about 2.5 to about 6.0, or from about 2.5 to about 5.9, or from about 2.5 to about 5.8, or from about 2.5 to about 5.7, or from about 2.5 to about 5.5, or from about 2.5 to about 5.1, or from about 2.5 to about 5.0, or from about 2.5 to about 4.2, or from about 2.5 to about 4.1, or from about 2.5 to about 4.0, or from about 2.6 to about 9.0, or from about 2.6 to about 7.0, or from about 2.6 to about 6.5, or from about 2.6 to about 6.0, or from about 2.6 to about 5.9, or from about 2.6 to about 5.8, or from about 2.6 to about 5.7, or from about 2.6 to about 5.5, or from about 2.6 to about 5.1, or from about 2.6 to about 5.0, or from about 2.6 to about 4.2, or from about 2.6 to about 4.1, or from about 2.6 to about 4.0, or from about 3.0 to about 9.0, or from about 3.0 to about 7.0, or from about 3.0 to about 6.5, or from about 3.0 to about 6.0, or from about 3.0 to about 5.9, or from about 3.0 to about 5.8, or from about 3.0 to about 5.7, or from about 3.0 to about 5.5, or from about 3.0 to about 5.1, or from about 3.0 to about 5.0, or from about 3.0 to about 4.2, or from about 3.0 to about 4.1, or from about 3.0 to about 4.0, or from about 3.1 to about 9.0, or from about 3.1 to about 7.0, or from about 3.1 to about 6.5, or from about 3.1 to about 6.0, or from about 3.1 to about 5.9, or from about 3.1 to about 5.8, or from about 3.1 to about 5.7, or from about 3.1 to about 5.5, or from about 3.1 to about 5.1, or from about 3.1 to about 5.0, or from about 3.1 to about 4.2, or from about 3.1 to about 4.1, or from about 3.1 to about 4.0, or from about 3.5 to about 9.0, or from about 3.5 to about 7.0, or from about 3.5 to about 6.5, or from about 3.5 to about 6.0, or from about 3.5 to about 5.9, or from about 3.5 to about 5.8, or from about 3.5 to about 5.7, or from about 3.5 to about 5.5, or from about 3.5 to about 5.1, or from about 3.5 to about 5.0, or from about 3.5 to about 4.2, or from about 3.5 to about 4.1, or from about 3.5 to about 4.0, or from about 4.0 to about 9.0, or from about 4.0 to about 7.0, or from about 4.0 to about 6.5, or from about 4.0 to about 6.0, or from about 4.0 to about 5.9, or from about 4.0 to about 5.8, or from about 4.0 to about 5.7, or from about 4.0 to about 5.5, or from about 4.0 to about 5.1, or from about 4.0 to about 5.0, or from about 4.0 to about 4.2, or from about 4.0 to about 4.1, or from about 4.1 to about 9.0, or from about 4.1 to about 7.0, or from about 4.1 to about 6.5, or from about 4.1 to about 6.0, or from about 4.1 to about 5.9, or from about 4.1 to about 5.8, or from about 4.1 to about 5.7, or from about 4.1 to about 5.5, or from about 4.1 to about 5.1, or from about 4.1 to about 5.0, or from about 4.5 to about 9.0, or from about 4.5 to about 7.0, or from about 4.5 to about 6.5, or from about 4.5 to about 6.0, or from about 4.5 to about 5.9, or from about 4.5 to about 5.8, or from about 4.5 to about 5.7, or from about 4.5 to about 5.5, or from about 4.5 to about 5.1.

It has been found that mica having a high lamellarity index (e.g. no less than about 3.5, or preferably no less than about 4.0) tends to increase the flexural modulus of polymer compositions into which it is incorporated.

The mica particulate may have a $d_{95}$, by laser, no greater than about 150 μm, for example, no greater than about 140 μm, or no greater than about 130 μm, or no greater than about 120 μm, or no greater than about 110 μm, or no greater than about 100 μm, or no greater than about 90 μm, or no greater than about 80 μm, or no greater than about 70 μm, or no grater than about 60 μm, or no greater than about 50 μm, or no greater than about 25 μm, or no greater than about 10 μm. The mica particulate may have a $d_{95}$, by laser, no less than about 5 μm, for example, no less than about 8 μm, or no less than about 25 μm, or no less than about 40 μm, or no less than about 50 μm, or no less than about 60 μm, or no less than about 70 μm, or no less than about 80 μm, or no less than about 90 μm, or no less than about 100 μm. The mica particulate may have a $d_{95}$, by laser, from about 5 μm to about 150 μm, for example, from about 5 μm to about 140 μm, or from about 5 μm to about 130 μm, or from about 5 μm to about 120 μm, or from about 5 μm to about 110 μm, or from about 5 μm to about 100 μm, or from about 5 μm to about 90 μm, or from about 5 μm to about 80 μm, or from about 5 μm to about 70 μm, or from about 5 μm to about 60 μm, or from about 5 μm to about 50 μm, or from about 5 μm to about 25 μm, or from about 5 μm to about 10 μm, or from about 8 μm to about 150 μm, or from about 8 μm to about 140 μm, or from about 8 μm to about 130 μm, or from about 8 μm to about 120 μm, or from about 8 μm to about 110 μm, or from about 8 μm to about 100 μm, or from about 8 μm to about 90 μm, or from about 8 μm to about 80 μm, or from about 8 μm to about 70 μm, or from about 8 μm to about 60 μm, or from about 8 μm to about 50 μm, or from about 8 μm to about 25 μm, or from about 8 μm to about 10 μm, or from about 25 μm to about 150 μm, or from about 25 μm to about 140 μm, or from about 25 μm to about 130 μm, or from about 25 μm to about 120 μm, or from about 25 μm to about 110 μm, or from about 25 μm to about 100 μm, or from about 25 μm to about 90 μm, or from about 25 μm to about 80 μm, or from about 25 μm to about 70 μm, or from about 25 μm to about 60 μm, or from about 25 μm to about 50 μm, or from about 40 μm to about 150 μm, or from about 40 μm to about 140 μm, or from about 40 μm to about 130 μm, or from about 40 μm to about 120 μm, or from about 40 μm to about 110 μm, or from about 40 μm to about 100 μm, or from about 40 μm to about 90 μm, or from about 40 μm to about 80 μm, or from about 40 μm to about 70 μm, or from about 40 μm to about 60 μm, or from about 40 μm to about 50 μm, or from about 50 μm to about 150 μm, or from about 50 μm to about 140 μm, or from about 50 μm to about 130 μm, or from about 50 μm to about 120 μm, or from about 50 μm to about 110 μm, or from about 50 μm to about 100 μm, or from about 50 μm to about 90 μm, or from about 50 μm to about 80 μm, or from about 50 μm to about 70 μm, or from about 50 μm to about 60 μm, or from about 60 μm to about 150 μm, or from about 60 μm to about 140 μm, or from about 60 μm to about 130 μm, or from about 60 μm to about 120 μm, or from about 60 μm to about 110 μm, or from about 60 μm to about 100 μm, or from about 60 μm to about 90 μm, or from about 60 μm to about 80 μm, or from about 60 μm to about 70 μm, or from about 70 μm to about 150 μm, or from about 70 μm to about 140 μm, or from about 70 μm to about 130 μm, or from about 70 μm to about 120 μm, or from about 70 μm to about 110 μm, or from about 70 μm to about 100 μm, or from about 70 μm to about 90 μm, or from about 70 μm to about 80 μm, or from about 80 μm to about 150 μm, or from about 80 μm to about 140 μm, or from about 80 μm to about 130 μm, or from about 80 μm to about 120 μm, or from about 80 μm to about 110 μm, or from about 80 μm to about 100 μm, or from about 80 μm to about 90 μm, or from about 90 μm to about 150 μm, or from about 90 μm to about 140 μm, or from about 90 μm to about 130 μm, or from about 90 μm to about 120 μm, or from about 90 μm to about 110 μm, or from about 90 μm to about 100 μm, or from about 100 μm to about 150 μm, or from about 100 μm to about 140 μm, or from about 100 μm to about 130 μm, or from about 100 μm to about 120 μm, or from about 100 μm to about 110 μm.

The mica particulate may have a $d_{95}$, by sedigraph, no greater than about 30 μm, for example, no greater than about 25 μm, or no greater than about 20 μm, or no greater than about 15 μm, or no greater than about 12 μm, or no greater than about 11 μm, or no greater than about 10 μm, or no greater than about 5 μm. The mica particulate may have a $d_{95}$, by sedigraph, no less than about 2 μm, for example, no less than about 5 μm, or no less than about 10 μm, or no less than about 11 μm, or no less than about 15 μm, or no less than about 20 μm. The mica particulate may have a $d_{95}$, by sedigraph, from about 2 μm to about 30 μm, for example, from about 2 μm to about 25 μm, or from about 2 μm to about 20 μm, or from about 2 μm to about 15 μm, or from about 2 μm to about 12 μm, or from about 2 μm to about 11 μm, or from about 2 μm to about 10 μm, or from about 2 μm to about 5 μm, or from about 5 μm to about 30 μm, or from about 5 μm to about 25 μm, or from about 5 μm to about 20 μm, or from about 5 μm to about 15 μm, or from about 5 μm to about 12 μm, or from about 5 μm to about 11 μm, or from about 5 μm to about 10 μm, or from about 10 μm to about 30 μm, or from about 10 μm to about 25 μm, or from about 10 μm to about 20 μm, or from about 10 μm to about 15 μm, or from about 10 μm to about 12 μm, or from about 10 μm to about 11 μm, or from about 11 μm to about 30 μm, or from about 11 μm to about 25 μm, or from about 11 μm to about 20 μm, or from about 11 μm to about 15 μm, or from about 11 μm to about 12 μm, or from about 15 μm to about 30 μm, or from about 15 μm to about 25 μm, or from about 15 μm to about 20 μm, or from about 20 μm to about 30 μm, or from about 20 μm to about 25 μm.

It has been found that mica having a low topcut, i.e. a low $d_{95}$ (e.g. by laser: no greater than about 150 μm, or preferably no greater than about 130 μm, or more preferably no greater than about 100 μm, or even more preferably no greater than about 60 μm; or by sedigraph: no greater than about 30 μm, or preferably no greater than about 20 μm, or more preferably no greater than about 15 μm), tends to increase the impact strength of polymer compositions into which it is incorporated.

The mica particulate may have a $d_{50}$, by laser, no greater than about 40 μm, for example, no greater than about 35 μm, or no greater than about 25 μm, or no greater than about 20 μm, or no greater than about 10 μm, or no greater than about 5 μm. The mica particulate may have a $d_{50}$, by laser, no less than about 3 μm, for example, no less than about 10 μm, or no less than about 15 μm, or no less than about 20 μm, or no less than about 30 μm. The mica particulate may have a $d_{50}$, by laser, from about 3 μm to about 40 μm, for example, from about 3 μm to about 35 μm, or from about 3 μm to about 25 μm, or from about 3 μm to about 20 μm, or from about 3 μm to about 10 μm, or from about 3 μm to about 5 μm, or from about 10 μm to about 40 μm, or from about 10 μm to about 35 μm, or from about 10 μm to about 25 μm, or from about 10 μm to about 20 μm, or from about 15 μm to about 40 μm, or from about 15 μm to about 35 μm, or from about 15 μm to about 25 μm, or from about 15 μm to about 20 μm, or from about 20 μm to about 40 μm, or from about 20 μm to about 35 μm, or from about 20 μm to about 25 μm, or from about 30 μm to about 40 μm, or from about 30 μm to about 35 μm.

The mica particulate may have a $d_{50}$, by sedigraph, no greater than about 6 μm (e.g. no greater than about 6.0 μm), for example, no greater than about 5 μm (e.g. no greater than about 5.0 μm), or no greater than about 4 μm (e.g. no greater than about 4.0 μm), or no greater than about 3 μm (e.g. no greater than about 3.0 μm), or no greater than about 2 μm (e.g. no greater than about 2.0 μm), or no greater than about 1 μm (e.g. no greater than about 1.0 μm). The mica particulate may have a $d_{50}$, by sedigraph, no less than about 0.5 μm, for example, no less than about 1 μm (e.g. no less than about 1.0 μm), or no less than about 2 μm (e.g. no less than about 2.0 μm), or no less than about 3 μm (e.g. no less than about 3.0 μm), or no less than about 3.5 μm, or no less than about 4 μm (e.g. no less than about 4.0 μm), or no less than about 5 μm (e.g. no less than about 5.0 μm). The mica particulate may have a $d_{50}$, by sedigraph, from about 0.5 μm to about 6 μm (e.g. to about 6.0 μm), for example, from about 0.5 μm to about 5 μm (e.g. to about 5.0 μm), or from about 0.5 μm to about 4 μm (e.g. to about 4.0 μm), or from about 0.5 μm to about 3 μm (e.g. to about 3.0 μm), or from about 0.5 μm to about 2 μm (e.g. to about 2.0 μm), or from about 0.5 μm to about 1 μm (e.g. to about 1.0 μm), or from about 1 μm (e.g. from about 1.0 μm) to about 6 μm (e.g. to about 6.0 μm), or from about 1 μm (e.g. from about 1.0 μm) to about 5 μm (e.g. to about 5.0 μm), or from about 1 μm (e.g. from about 1.0 μm) to about 4 μm (e.g. to about 4.0 μm), or from about 1 μm (e.g. from about 1.0 μm) to about 3 μm (e.g. to about 3.0 μm), or from about 1 μm (e.g. from about 1.0 μm) to about 2 μm (e.g. to about 2.0 μm), or from about 2 μm (e.g. from about 2.0 μm) to about 6 μm (e.g. to about 6.0 μm), or from about 2 μm (e.g. from about 2.0 μm) to about 5 μm (e.g. to about 5.0 μm), or from about 2 μm (e.g. from about 2.0 μm) to about 4 μm (e.g. to about 4.0 μm), or from about 2 μm (e.g. from about 2.0 μm) to about 3 μm (e.g. to about 3.0 μm), or from about 3 μm (e.g. from about 3.0 μm) to about 6 μm (e.g. to about 6.0 μm), or from about 3 μm (e.g. from about 3.0 μm) to about 5 μm (e.g. to about 5.0 μm), or from about 3 μm (e.g. from about 3.0 μm) to about 4 μm (e.g. to about 4.0 μm), or from about 3.5 μm to about 6 μm (e.g. to about 6.0 μm), or from about 3.5 μm to about 5 μm (e.g. to about 5.0 μm), or from about 3.5 μm to about 4 μm (e.g. to about 4.0 μm), or from about 4 μm (e.g. from about 4.0 μm) to about 6 μm (e.g. to about 6.0 μm), or from about 4 μm (e.g. from about 4.0 μm) to about 5 μm (e.g. to about 5.0 μm), or from about 5 μm (e.g. from about 5.0 μm) to about 6 μm (e.g. to about 6.0 μm).

The mica particulate may have a $d_{25}$, by laser, no greater than about 25 μm, for example, no greater than about 20 μm, or no greater than about 15 μm, or no greater than about 10 μm, or no greater than about 5 μm. The mica particulate may have a $d_{25}$, by laser, no less than about 0.5 μm, for example, no less than about 1 μm (e.g. no less than about 1.0 μm), or no less than about 5 μm, or no less than about 10 μm. The mica particulate may have a $d_{25}$, by laser, from about 0.5 μm to about 25 μm, for example, from about 0.5 μm to about 20 μm, or from about 0.5 μm to about 15 μm, or from about 0.5 μm to about 10 μm, or from about 0.5 μm to about 5 μm, or from about 1 μm (e.g. from about 1.0 μm) to about 25 μm, or from about 1 μm (e.g. from about 1.0 μm) to about 20 μm, or from about 1 μm (e.g. from about 1.0 μm) to about 15 μm, or from about 1 μm (e.g. from about 1.0 μm) to about 10 μm, or from about 1 μm (e.g. from about 1.0 μm) to about 5 μm, or from about 5 μm to about 25 μm, or from about 5 μm to about 20 μm, or from about 5 μm to about 15 μm, or from about 5 μm to about 10 μm, or from about 10 μm to about 25 μm, or from about 10 μm to about 20 μm, or from about 10 μm to about 15 μm.

The mica particulate may have a $d_{25}$, by sedigraph, no greater than about 4 μm (e.g. no greater than about 4.0 μm), for example, no greater than about 3 μm (e.g. no greater than about 3.0 μm), or no greater than about 2 μm (e.g. no greater than about 2.0 μm), or no greater than about 1 μm (e.g. no greater than about 1.0 μm). The mica particulate may have a $d_{25}$, by sedigraph, no less than about 0.1 μm, for example, no less than about 0.5 μm, or no less than about 1 μm (e.g. no less than about 1.0 μm), or no less than about 1.5 μm. The mica particulate may have a $d_{25}$, by sedigraph, from about 0.1 μm to about 4 μm (e.g. to about 4.0 μm), for example, from about 0.1 μm to about 3 μm (e.g. to about 3.0 μm), or from about 0.1 μm to about 2 μm (e.g. to about 2.0 μm), or from about 0.1 μm to about 1 μm (e.g. to about 1.0 μm), or from about 0.5 μm to about 4 μm (e.g. to about 4.0 μm), or from about 0.5 μm to about 3 μm (e.g. to about 3.0 μm), or from about 0.5 μm to about 2 μm (e.g. to about 2.0 μm), or from about 0.5 μm to about 1 μm (e.g. to about 1.0 μm), or from about 1 μm (e.g. from about 1.0 μm) to about 4 μm (e.g. to about 4.0 μm), or from about 1 μm (e.g. from about 1.0 μm) to about 3 μm (e.g. to about 3.0 μm), or from about 1 μm (e.g. from about 1.0 μm) to about 2 μm (e.g. to about 2.0 μm), or from about 1.5 μm to about 4 μm (e.g. to about 4.0 μm), or from about 1.5 μm to about 3 μm (e.g. to about 3.0 μm), or from about 1.5 μm to about 2 μm (e.g. to about 2.0 μm).

The mica particulate may have a $d_{75}$, by laser, no greater than about 60 μm, for example, no greater than about 50 μm, or no greater than about 40 μm, or no greater than about 35 μm, or no greater than about 30 μm, or no greater than about 15 μm, or no greater than about 10 μm. The mica particulate may have a $d_{75}$, by laser, no less than about 3 μm, for example, no less than about 10 μm, or no less than about 15 μm, or no less than about 20 μm, or no less than about 25 μm, or no less than about 30 μm. The mica particulate may have a $d_{75}$, by laser, from about 3 μm to about 60 μm, for example, from about 3 μm to about 50 μm, or from about 3 μm to about 40 μm, or from about 3 μm to about 35 μm, or from about 3 μm to about 30 μm, or from about 3 μm to about 15 μm, or from about 3 μm to about 10 μm, or from about 10 μm to about 60 μm, or from about 10 μm to about 50 μm, or from about 10 μm to about 40 μm, or from about 10 μm to about 35 μm, or from about 10 μm to about 30 μm, or from about 10 μm to about 15 μm, or from about 15 μm to about 60 μm, or from about 15 μm to about 50 μm, or from about 15 μm to about 40 μm, or from about 15 μm to about 35 μm, or from about 15 μm to about 30 μm, or from about 20 μm to about 60 μm, or from about 20 μm to about 50 μm, or from about 20 μm to about 40 μm, or from about 20 μm to about 35 μm, or from about 20 μm to about 30 μm, or from about 25 μm to about 60 μm, or from about 25 μm to about 50 μm, or from about 25 μm to about 40 μm, or from about 25 μm to about 35 μm, or from about 25 μm to about 30 μm, or from about 30 μm to about 60 μm, or from about 30 μm to about 50 μm, or from about 30 μm to about 40 μm, or from about 30 μm to about 35 μm.

The mica particulate may have a $d_{75}$, by sedigraph, no greater than about 15 μm, for example, no greater than about 10 μm, or no greater than about 7 μm (e.g. no greater than about 7.0 μm), or no greater than about 6 μm (e.g. no greater than about 6.0 μm), or no greater than about 5 μm (e.g. no greater than about 5.0 μm), or no greater than about 3 μm (e.g. no greater than about 3.0 μm), or no greater than about 2 μm (e.g. no greater than about 2.0 μm). The mica particulate may have a $d_{75}$, by sedigraph, no less than about 0.5 μm, for example, no less than about 1 μm (e.g. no less than about 1.0 μm), or no less than about 5 μm (e.g. no less than about 5.0 μm), or no less than about 6 μm (e.g. no less than about 6.0 μm). The mica particulate may have a $d_{75}$, by sedigraph, from about 0.5 μm to about 15 μm, for example, from about 0.5 μm to about 10 μm, or from about 0.5 μm to about 7 μm (e.g. to about 7.0 μm), or from about 0.5 μm to about 6 μm (e.g. to about 6.0 μm), or from about 0.5 μm to about 5 μm (e.g. to about 5.0 μm), or from about 0.5 μm to about 3 μm (e.g. to about 3.0 μm), or from about 0.5 μm to about 2 μm (e.g. to about 2.0 μm), or from about 1 μm (e.g. from about 1.0 μm) to about 15 μm, or from about 1 μm (e.g. from about 1.0 μm) to about 10 μm, or from about 1 μm (e.g. from about 1.0 μm) to about 7 μm (e.g. to about 7.0 μm), or from about 1 μm (e.g. from about 1.0 μm) to about 6 μm (e.g. to about 6.0 μm), or from about 1 μm (e.g. from about 1.0 μm) to about 5 μm (e.g. to about 5.0 μm), or from about 1 μm (e.g. from about 1.0 μm) to about 3 μm (e.g. to about 3.0 μm), or from about 1 μm (e.g. from about 1.0 μm) to about 2 μm (e.g. to about 2.0 μm), or from about 5 μm (e.g. from about 5.0 μm) to about 15 μm, or from about 5 μm (e.g. from about 5.0 μm) to about 10 μm, or from about 5 μm (e.g. from about 5.0 μm) to about 7 μm (e.g. to about 7.0 μm), or from about 5 μm (e.g. from about 5.0 μm) to about 6 μm (e.g. to about 6.0 μm), or from about 6 μm (e.g. from about 6.0 μm) to about 15 μm, or from about 6 μm (e.g. from about 6.0 μm) to about 10 μm, or from about 6 μm (e.g. from about 6.0 μm) to about 7 μm (e.g. to about 7.0 μm).

The mica particulate may have Minolta Y whiteness no less than about 70, for example, no less than about 75, or no less than about 80. The mica particulate may have a Minolta Y whiteness no greater than about 88, for example, no greater than about 85. The mica particulate may have a Minolta Y whiteness from about 70 to about 88, for example, from about 75 to about 88, or from about 80 to about 88, or from about 70 to about 85, or from about 75 to about 85, or from about 80 to about 85. Minolta Y whiteness may be measured using a spectrophotometer/colorimeter such as the Konica Minolta CM-3700d (available from Konica Minolta Sensing Europe B.V.) with D65 illuminant, 10 nm spectral interval, reflection measurement, d/8 geometry, and color space CIE LAB 1964 (10°). Before measurement, it is checked whether the sample contains compacted powder granules; if so, 10 g of the sample is passed through a coffee grinder for 30 seconds. Then, the sample is pelletized. An annular mount is placed at the lower end of a mold tube and the assembly is placed on a glass plate. Approximately 5 g of the dry powder to be characterized is placed in the tube. A plunger is gently slid into the tube until it comes into contact with the powder. A lug, located on a lever, is rested on the upper part of the plunger so as to compact the powder. The pressure is allowed to build for 30 seconds. The lever, the plunger and then the tube is removed. The bottom of the mount is placed on the annular mount and, while firmly holding the assembly on the glass plate, the back of the frame mount is screwed in using a special key. The pressed powder pellet clamped into the annular mount must have a flawless surface finish; otherwise, the pelletizing operation is repeated. Once pelletized, the spectrophotometer/colorimeter is calibrated using a white plate and then the Minolta Y whiteness of the pelletized sample is measured.

The mica particulate may have a PANACEA shape factor no less than about 100, for example, no less than about 120, or no less than about 140, or no less than about 145. The mica particulate may have a PANACEA shape factor no greater than about 250, for example, no greater than about 200, or no greater than about 175, or no greater than about 165. The mica particulate may have a PANACEA shape factor from about 100 to about 250, for example, from about 100 to about 200, or from about 100 to about 175, or from about 100 to about 165, or from about 120 to about 250, or from about 120 to about 200, or from about 120 to about 175, or from about 120 to about 165, or from about 140 to about 250, or from about 140 to about 200, or from about 140 to about 175, or from about 140 to about 165, or from about 145 to about 250, or from about 145 to about 200, or from about 145 to about 175, or from about 145 to about 165.

The PANACEA shape factor refers to the property measured by the PANACEA (Particle Assessment by Natural Alignment and Conductivity Effect Analysis) method. This is equipment that enables the shape factor of a mineral to be measured. The equipment described in U.S. Pat. No. 5,576,617 and WO2013/015841, the contents of which are incorporated herein by reference in their entirety, can be used. During the measurement, a mica particulate suspension is circulated by a pump through a cell where the conductivity is measured from one extremity to the other. When the pump is turned on, the non-spherical particles will naturally align along the axis of the pipe. In this position, the particles will present a minimal resistance to the flow of the electrical charges. The conductivity measurement is then maximal. When the pump is off, the particles will randomly orient according to Brownian movement. In this position, the electrical charges have to go through a longer path to progress in the suspension. The conductivity value then decreases. The number that is given by the tests results from the ratio between these 2 measurements (highest value over lowest value). Hence, a more lamellar product will lead to a higher ratio (higher shape factor) between these 2 measurements compared to a product showing a low lamellarity (lower shape factor).

For the shape factor measurement itself, a suspension volume corresponding to 50 g of dry product is taken. In order to avoid sedimentation when the pump is off, 10 mL of a dispersant, e.g. sodium polyacrylate, and 80 mL deionised water is added before homogenising the suspension. Then, the suspension is passed through a 53 μm BSS sieve in order to eliminate the coarse particles that may hinder the measurement. Deionized water (around 200 mL) is added in order to obtain a density between 1.08 and 1.12 (i.e. a weight concentration between 12 and 17 wt. %, for example approximately 15 wt. %). The pH of the suspension is then measured to check it is within 8.5 and 10 and if it is not the case, sodium hydroxide is added. The suspension is then left to stand for at least 20 minutes. The PANACEA method is then performed after vigorously shaking to re-suspend the sample. The method is performed at room temperature, for example, at about 23° C. The shape factor is obtained from an average of at least 3 measurements.

Mica is a layered mineral. The crystal structure of mica is described as TOT-c because it is composed of parallel TOT layers weakly bonded to one another by cations (c) such as sodium, potassium or calcium ions. The TOT layers consist of $AlSi_3O_{10}^{5-}$ tetrahedral ("T") layers and $Al(OH)^{2+}$ or $M_3(OH)_2^{4+}$ octahedral ("O") layers (where M is a divalent ion such as ferrous iron or magnesium). The number of TOT layers (N(TOT)) per mica crystallite can be determined X-Ray Diffraction (XRD) and applying the Scherrer equation on the (002) and (006) peaks of the pattern.

For example, XRD patterns may be acquired using a PAnalytical X'PRO X-Ray diffractometer using a CuKα radiation of a wavelength of λ=1.5406 Å. The samples are obtained by filling an aluminium holder in order to obtain a quasi-random orientation. An example of acquisition parameters can be in the 2θ range=8-80° with a step size of 0.01° and a step duration of 2 s. The Scherrer equation is then applied on the (002) and (006) peaks of the mica pattern which are located at approximately 2θ=8.7-9.1° and 2θ=17.5-17.9° on the XRD pattern. This formula uses the width of the peak at half height relative to the background line in order to calculate the coherent scattering domain of the mica crystallite according the c* axis. Then, the number of TOT layers in a single mica crystallite can be deduced. This method is implemented in a paper on synthetic talc (Dumas et al., Angewandte Chemie International Edition 2016, 55, 9868-9871), the contents of which are incorporated herein by reference.

The Scherrer equation is expressed as follows:

$$L = \frac{\lambda \times 0.91}{FWHM \times \cos\theta}$$

L is the coherent scattering domain (CSD c*) (Å).

λ is the wavelength of the X-Ray beam (Å).

FWHM is the full width at half maximum of the considered diffraction peak (rad)

θ is the position of the diffraction peak (rad)

From this coherent scattering domain, it is possible to deduce the number of TOT layers (N(TOT)) that are stacked in the coherent scattering domain:

$$N(TOT) = \frac{L}{d}$$

L is the coherent scattering domain along c* axis (Å)

d is the height of a mica elementary unit, i.e. the d(002) spacing d is calculated using the position of the (002) peak on the XRD pattern and the Bragg formula.

$$d = \frac{n\lambda}{2\sin\theta}$$

n is the diffraction order

λ is the wavelength of the X-Ray beam (Å)

θ is the position of the diffraction peak (rad)

A delamination index (DI(TOT)) according to the number (N) of tetrahedral-octahedral-tetrahedral (TOT) layers per mica crystallite is defined by the following equation:

$$DI(TOT) = \frac{\text{Shape Factor}\,(PANACEA)}{N(TOT)} \times 100$$

The mica particulate may have a DI(TOT) no less than about 100, for example, no less than about 105, or no less than about 110, or no less than about 120, or no less than about 130, or no less than about 140. The mica particulate may have a DI(TOT) no greater than about 160, for example, no greater than about 150, or no greater than about 140, or no greater than about 130, or no greater than about 120. The mica particulate may have a DI(TOT) from about 100 to about 160, for example, from about 100 to about 150, or from about 100 to about 140, or from about 100 to about 130, or from about 100 to about 120, or from about 105 to about 160, or from about 105 to about 150, or from about 105 to about 140, or from about 105 to about 130, or from about 105 to about 120, or from about 110 to about 160, or from about 110 to about 150, or from about 110 to about 140, or from about 110 to about 130, or from about 110 to about 120, or from about 120 to about 160, or from about 120 to about 150, or from about 120 to about 140, or from about 120 to about 130, or from about 130 to about 160, or from about 130 to about 150, or from about 130 to about 140, or from about 140 to about 160, or from about 140 to about 150.

The mica particulate may have: (a) a BET specific surface area no less than about 4.5 $m^2/g$; and (b) a lamellarity index no less than about 2.5. For example, the mica particulate may have: (a) a BET specific surface area from about 4.5 $m^2/g$ to about 50 $m^2/g$, for example, from about 5.0 $m^2/g$ to about 12 $m^2/g$; and (b) a lamellarity index from about 2.5 to about 6.5, for example, from about 4.0 to about 5.7.

The mica particulate may have: (a) a BET specific surface area no less than about 4.5 $m^2/g$; (b) a lamellarity index no less than about 2.5; (c) a $d_{95}$, by laser, no greater than about 150 μm, for example, from about 5 μm to about 150 μm, or from about 40 μm to about 130 μm; and (d) a $d_{95}$, by sedigraph, no greater than about 30 μm, for example, from about 2 μm to about 30 μm, or from about 10 μm to about 30 μm. For example, the mica particulate may have: (a) a BET specific surface area from about 4.5 $m^2/g$ to about 50 $m^2/g$, for example, from about 5.0 $m^2/g$ to about 12 $m^2/g$; (b) a lamellarity index from about 2.5 to about 6.5, for example, from about 4.0 to about 5.7; (c) a $d_{95}$, by laser, no greater than about 150 μm, for example, from about 5 μm to about 150 μm, or from about 40 μm to about 130 μm; and (d) a $d_{95}$, by sedigraph, no greater than about 30 μm, for example, from about 2 μm to about 30 μm, or from about 10 μm to about 30 μm.

The mica particulate may have: (a) a BET specific surface area no less than about 4.5 $m^2/g$; (b) a lamellarity index no less than about 2.5; (c) a $d_{95}$, by laser, no greater than about 150 μm, for example, from about 5 μm to about 150 μm, or from about 40 μm to about 130 μm; (d) a $d_{95}$, by sedigraph, no greater than about 30 μm, for example, from about 2 μm to about 30 μm, or from about 10 μm to about 30 μm; and (e) one or more of: (i) a $d_{50}$, by laser, no greater than about 40 μm, for example, from about 3 μm to about 40 μm, or from about 20 μm to about 40 μm; (ii) a $d_{50}$, by sedigraph, no greater than about 6 μm, for example, from about 0.5 μm to about 6 μm, or from about 3.5 μm to about 6 μm; (iii) a Minolta Y whiteness no less than about 70, for example, from about 70 to about 88; and/or (iv) a PANACEA shape factor from about 100 to about 250, for example, from about 140 to about 180.

For example, the mica particulate may have: (a) a BET specific surface area from about 4.5 $m^2/g$ to about 50 $m^2/g$, for example, from about 5.0 $m^2/g$ to about 12 $m^2/g$; (b) a lamellarity index from about 2.5 to about 6.5, for example, from about 4.0 to about 5.7; (c) a $d_{95}$, by laser, no greater than about 150 μm, for example, from about 5 μm to about 150 μm, or from about 40 μm to about 130 μm; (d) a $d_{95}$, by sedigraph, no greater than about 30 μm, for example, from about 2 μm to about 30 μm, or from about 10 μm to about 30 μm; and (e) one or more of: (i) a $d_{50}$, by laser, no greater than about 40 μm, for example, from about 3 μm to about 40 μm, or from about 20 μm to about 40 μm; (ii) a $d_{50}$, by sedigraph, no greater than about 6 μm, for example, from about 0.5 μm to about 6 μm, or from about 3.5 μm to about 6 μm; (iii) a Minolta Y whiteness no less than about 70, for example, from about 70 to about 88; and/or (iv) a PANACEA shape factor from about 100 to about 250, for example, from about 140 to about 180.

For example, the mica particulate may have: (a) a BET specific surface area from about 4.5 $m^2/g$ to about 50 $m^2/g$, for example, from about 5.0 $m^2/g$ to about 12 $m^2/g$; (b) a lamellarity index from about 2.5 to about 6.5, for example, from about 4.0 to about 5.7; (c) a $d_{95}$, by laser, no greater than about 150 μm, for example, from about 5 μm to about 150 μm, or from about 40 μm to about 130 μm; (d) a $d_{95}$, by sedigraph, no greater than about 30 μm, for example, from about 2 μm to about 30 μm, or from about 10 μm to about 30 μm; (e) a $d_{50}$, by laser, no greater than about 40 μm, for example, from about 3 μm to about 40 μm, or from about 20 μm to about 40 μm; (f) a $d_{50}$, by sedigraph, no greater than about 6 μm, for example, from about 0.5 μm to about 6 μm, or from about 3.5 μm to about 6 μm; (g) a Minolta Y whiteness no less than about 70, for example, from about 70 to about 88; and (h) a PANACEA shape factor from about 100 to about 250, for example, from about 140 to about 180.

The mica particulate may comprise no less than about 90 wt. % muscovite and have: (a) a BET specific surface area no less than about 4.5 $m^2/g$; (b) a lamellarity index no less than about 2.5; (c) a des, by laser, no greater than about 150 μm, for example, from about 5 μm to about 150 μm, or from about 40 μm to about 130 μm; (d) a $d_{95}$, by sedigraph, no greater than about 30 μm, for example, from about 2 μm to about 30 μm, or from about 10 μm to about 30 μm; and (e) one or more of: (i) a $d_{50}$, by laser, no greater than about 40 μm, for example, from about 3 μm to about 40 μm, or from about 20 μm to about 40 μm; (ii) a $d_{50}$, by sedigraph, no greater than about 6 μm, for example, from about 0.5 μm to about 6 μm, or from about 3.5 μm to about 6 μm; (iii) a Minolta Y whiteness no less than about 70, for example, from about 70 to about 88; and/or (iv) a PANACEA shape factor from about 100 to about 250, for example, from about 140 to about 180.

For example, the mica particulate may comprise no less than about 90 wt. % muscovite and have: (a) a BET specific surface area from about 4.5 $m^2/g$ to about 50 $m^2/g$, for example, from about 5.0 $m^2/g$ to about 12 $m^2/g$; (b) a lamellarity index from about 2.5 to about 6.5, for example, from about 4.0 to about 5.7; (c) a $d_{95}$, by laser, no greater than about 150 μm, for example, from about 5 μm to about 150 μm, or from about 40 μm to about 130 μm; (d) a $d_{95}$, by sedigraph, no greater than about 30 μm, for example, from about 2 μm to about 30 μm, or from about 10 μm to about 30 μm; and (e) one or more of: (i) a $d_{50}$, by laser, no greater than about 40 μm, for example, from about 3 μm to about 40 μm, or from about 20 μm to about 40 μm; (ii) a $d_{50}$, by sedigraph, no greater than about 6 μm, for example, from about 0.5 μm to about 6 μm, or from about 3.5 μm to about 6 μm; (iii) a Minolta Y whiteness no less than about 70, for example, from about 70 to about 88; and/or (iv) a PANACEA shape factor from about 100 to about 250, for example, from about 140 to about 180.

For example, the mica particulate may comprise no less than about 90 wt. % muscovite and have: (a) a BET specific surface area from about 4.5 $m^2/g$ to about 50 $m^2/g$, for example, from about 5.0 $m^2/g$ to about 12 $m^2/g$; (b) a lamellarity index from about 2.5 to about 6.5, for example, from about 4.0 to about 5.7; (c) a $d_{95}$, by laser, no greater than about 150 μm, for example, from about 5 μm to about 150 μm, or from about 40 μm to about 130 μm; (d) a $d_{95}$, by sedigraph, no greater than about 30 μm, for example, from about 2 μm to about 30 μm, or from about 10 μm to about 30 μm; (e) a $d_{50}$, by laser, no greater than about 40 μm, for example, from about 3 μm to about 40 μm, or from about 20 μm to about 40 μm; (f) a $d_{50}$, by sedigraph, no greater than about 6 μm, for example, from about 0.5 μm to about 6 μm, or from about 3.5 μm to about 6 μm; (g) a Minolta Y whiteness no less than about 70, for example, from about 70 to about 88; and (h) a PANACEA shape factor from about 100 to about 250, for example, from about 140 to about 180.

In some examples, the mica particulate has: (a) a BET specific surface area from about 4.5 $m^2/g$ to about 12.0 $m^2/g$, for example, from about 5.0 $m^2/g$ to about 10.0 $m^2/g$; and (b) a lamellarity index no less than about 2.5, for example, from about 2.5 to about 6.5, or from about 4.0 to about 5.7.

In some examples, the mica particulate has: (a) a BET specific surface area no less than about 4.5 $m^2/g$, for example, from about 4.5 $m^2/g$ to about 50.0 $m^2/g$, or from about 5.0 $m^2/g$ to about 12.0 $m^2/g$; and (b) a lamellarity index from about 2.5 to about 5.9, for example, from about 4.0 to about 5.7.

In some examples, the mica particulate has: (a) a BET specific surface area no less than about 4.5 $m^2/g$, for example, from about 4.5 $m^2/g$ to about 50.0 $m^2/g$, or from about 5.0 $m^2/g$ to about 12.0 $m^2/g$; (b) a lamellarity index no less than about 2.5, for example, from about 2.5 to about 6.5, or from about 2.5 to about 5.9, or from about 4.0 to about 5.7; and (c) one or both of: (i) a $d_{95}$, by laser, no greater than about 150 μm, for example, from about 5 μm to about 150 μm, or from about 40 μm to about 130 μm; and (ii) a $d_{95}$, by sedigraph, no greater than about 30 μm, for example, from about 2 μm to about 30 μm, or from about 10 μm to about 30 μm.

In some examples, the mica particulate has: (a) a BET specific surface area no less than about 4.5 $m^2/g$, for example, from about 4.5 $m^2/g$ to about 50.0 $m^2/g$, or from about 5.0 $m^2/g$ to about 12.0 $m^2/g$; (b) a lamellarity index no less than about 2.5, for example, from about 2.5 to about 6.5, or from about 2.5 to about 5.9, or from about 4.0 to about 5.7; and (c) a $d_{50}$, by laser, no greater than about 35 μm, for example, from about 10 μm to about 35 μm, or from about 15 μm to about 35 μm, or from about 15 μm to about 25 μm.

In some examples, the mica particulate comprises no less than about 90 wt. % muscovite and has: (a) a BET specific surface area no less than about 4.5 $m^2/g$; and (b) a lamellarity index no less than about 2.5.

In some examples, the mica particulate comprises no less than about 90 wt. % muscovite and has: (a) a BET specific surface area from about 4.5 $m^2/g$ to about 12.0 $m^2/g$, for example, from about 5.0 $m^2/g$ to about 10.0 $m^2/g$; and (b) a lamellarity index no less than about 2.5, for example, from about 2.5 to about 6.5, or from about 4.0 to about 5.7.

In some examples, the mica particulate comprises no less than about 90 wt. % muscovite and has: (a) a BET specific surface area no less than about 4.5 $m^2/g$, for example, from about 4.5 $m^2/g$ to about 50.0 $m^2/g$, or from about 5.0 $m^2/g$ to about 12.0 $m^2/g$; and (b) a lamellarity index from about 2.5 to about 5.9, for example, from about 4.0 to about 5.7.

In some examples, the mica particulate comprises no less than about 90 wt. % muscovite and has: (a) a BET specific surface area no less than about 4.5 $m^2/g$, for example, from about 4.5 $m^2/g$ to about 50.0 $m^2/g$, or from about 5.0 $m^2/g$ to about 12.0 $m^2/g$; (b) a lamellarity index no less than about 2.5, for example, from about 2.5 to about 6.5, or from about 2.5 to about 5.9, or from about 4.0 to about 5.7; and (c) one or both of: (i) a $d_{95}$, by laser, no greater than about 150 μm, for example, from about 5 μm to about 150 μm, or from about 40 μm to about 130 μm; and (ii) a $d_{95}$, by sedigraph, no greater than about 30 μm, for example, from about 2 μm to about 30 μm, or from about 10 μm to about 30 μm.

In some examples, the mica particulate comprises no less than about 90 wt. % muscovite and has: (a) a BET specific surface area no less than about 4.5 $m^2/g$, for example, from about 4.5 $m^2/g$ to about 50.0 $m^2/g$, or from about 5.0 $m^2/g$ to about 12.0 $m^2/g$; (b) a lamellarity index no less than about 2.5, for example, from about 2.5 to about 6.5, or from about 2.5 to about 5.9, or from about 4.0 to about 5.7; and (c) a $d_{50}$, by laser, no greater than about 35 μm, for example, from about 10 μm to about 35 μm, or from about 15 μm to about 35 μm, or from about 15 μm to about 25 μm.

In some examples, the mica particulate is a muscovite particulate which has: (a) a BET specific surface area no less than about 4.5 $m^2/g$; and (b) a lamellarity index no less than about 2.5.

In some examples, the mica particulate is a muscovite particulate which has: (a) a BET specific surface area from about 4.5 $m^2/g$ to about 12.0 $m^2/g$, for example, from about 5.0 $m^2/g$ to about 10.0 $m^2/g$; and (b) a lamellarity index no less than about 2.5, for example, from about 2.5 to about 6.5, or from about 4.0 to about 5.7.

In some examples, the mica particulate is a muscovite particulate which has: (a) a BET specific surface area no less than about 4.5 $m^2/g$, for example, from about 4.5 $m^2/g$ to about 50.0 $m^2/g$, or from about 5.0 $m^2/g$ to about 12.0 $m^2/g$; and (b) a lamellarity index from about 2.5 to about 5.9, for example, from about 4.0 to about 5.7.

In some examples, the mica particulate is a muscovite particulate which has: (a) a BET specific surface area no less than about 4.5 $m^2/g$, for example, from about 4.5 $m^2/g$ to about 50.0 $m^2/g$, or from about 5.0 $m^2/g$ to about 12.0 $m^2/g$; (b) a lamellarity index no less than about 2.5, for example, from about 2.5 to about 6.5, or from about 2.5 to about 5.9, or from about 4.0 to about 5.7; and (c) one or both of: (i) a $d_{95}$, by laser, no greater than about 150 μm, for example, from about 5 μm to about 150 μm, or from about 40 μm to about 130 μm; and (ii) a $d_{95}$, by sedigraph, no greater than about 30 μm, for example, from about 2 μm to about 30 μm, or from about 10 μm to about 30 μm.

In some examples, the mica particulate is a muscovite particulate which has: (a) a BET specific surface area no less than about 4.5 $m^2/g$, for example, from about 4.5 $m^2/g$ to about 50.0 $m^2/g$, or from about 5.0 $m^2/g$ to about 12.0 $m^2/g$; (b) a lamellarity index no less than about 2.5, for example, from about 2.5 to about 6.5, or from about 2.5 to about 5.9, or from about 4.0 to about 5.7; and (c) a $d_{50}$, by laser, no greater than about 35 μm, for example, from about 10 μm to about 35 μm, or from about 15 μm to about 35 μm, or from about 15 μm to about 25 μm.

Optional Surface Treatment

In certain embodiments, the mica particulate is treated with a surface treatment agent. Surface treated mica may, for example, be referred to as coated mica. Surface treatment of the mica may serve to reduce or eliminate aggregation of the mica particulates and/or enhance incorporation of the mica particulate into a polymer composition.

In certain embodiments, the mica particulate is not treated with a surface treatment agent (uncoated mica).

Suitable surface treatment agents include a compound with hydrophobic carbon chains bearing polar radicals, for example, the family of amines, silanes, siloxanes, alcohols or acids and metals salts thereof.

In certain embodiments, surface treatment agent is a polyether or a derivative thereof, for example, polyether modified polysiloxane.

In certain embodiments, the polyether is a polyoxyalkylene (POA), for example, polyalkylene glycol (PAG) or polyalkylene oxide (PAO). As used herein, the term 'polyalkylene glycol' means a POA having a number average molecular mass below 20,000 g/mol, and the term 'polyalkylene oxide' means a POA having a number average molecular mass above 20,000 g/mol. In certain embodiments, the surface treatment agent comprises or is a polyalkylene glycol having a number average molecular mass of from about 100 to about 15,000 g/mol, for example, from about 200 to about 10,000 g/mol, or from about 500 to about 9000 g/mol, or from about 1000 to about 9000 g/mol, or from about 2000 to about 900 g/mol, or from about 4000 to about 9000 g/mol, or from about 6000 to about 9000 g/mol, or from about 6000 to about 8500 g/mol.

In certain embodiments, the polyether is a polyalkylene oxide selected from one or more of paraformaldehyde (polymethylene oxide), polytetramethylene glycol, polytetramethylene ether glycol, polyethylene oxide, polypropylene oxide, polybutylene oxide, and combinations thereof.

In certain embodiments, the surface treatment agent comprises or is polyethylene glycol. In certain embodiments, the surface treatment comprises or is a mixture of polyethylene glycol and polypropylene glycol (PPG). In certain embodiments, the surface treatment agent is polyethylene glycol having a number average molecular mass of from about 200 to about 10,000 g/mol, for example, from about 500 to about 9000 g/mol, or from about 1000 to about 9000 g/mol, or from about 2000 to about 900 g/mol, or from about 4000 to about 9000 g/mol, or from about 6000 to about 9000 g/mol, or from about 6000 to about 8500 g/mol. An exemplary PEG includes the Puriol™ range of polyglycols from BASF, for example, Puriol™ 8005.

In certain embodiments, the surface treatment agent comprises or is a fatty acid, and/or a metal salt thereof, for example, stearic acid or a metal stearate, such as magnesium, calcium or zinc stearate. This includes fatty acids having a carbon chain length from C8 to C24 and mixtures of fatty acids having a carbon chain length from C8 to C24.

Suitable silane based agents are aminosilanes, for example, trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine, and the like. Suitable agents having a hydrocarbyl group and a polar group are hydrocarbyl amines such as triethanolamine (TEA), and amino alcohol agents such as 2-amino-2-methyl-1-propanol. AMP-95® is a commercially available 2-amino-2-methyl-1-propanol formulation containing 5% water.

The surface treatment agent may be added in an amount effective to achieve the desired result. In certain embodiments, the quantity of surface treatment agent is from about 0.1% to 5% by weight with respect to the weight of mica, for example, from about 0.1% to 2% by weight with respect to the weight of mica.

Surface treatment agents may be applied by adding to the mica particulate and mixing using conventional methods. Surface treatment agents may be applied during preparation of the mica particulate from a relative coarse mica starting material and before the mica particulate is added to a polymer composition.

Method for Making the Mica Particulate

The mica particulate may be made by classifying a ground mica material. Classifying the ground mica material typically involves separating a fine fraction and a coarse fraction (e.g. removing the coarse fraction from the ground mica material, leaving behind the fine fraction).

The ground mica material may be a wet ground mica material (i.e. a ground mica material prepared by a wet grinding process). Wet ground mica material may have a higher lamellarity index than dry ground mica material because wet grinding typically preserves particle shape.

Classification refers to a process in which particles of the ground mica material (e.g. wet ground mica material) are separated by size. Classification may, for example, take place by any suitable method including, for example, air classification, sieve analysis and sedimentation. The classification may, for example, be dry classification. Preferably, the ground mica material (e.g. wet ground mica material) is classified using air classification or by sieve analysis. A suitable air classifier is the NETZSCH Ecutec BORA 50 turbo air classifier (available from NETZSCH-Feinmahltechnik GmbH, Germany). The NETZSCH Ecutec BORA 50 turbo air classifier has a maximum air flow of 1800 $m^3$/h, a maximum rotor speed of 8700 rpm, an installed power of 10 KW, a feed rate of up to 1800 kg/h and a main fan installed power of 30 kW. A suitable sieving apparatus is the electromagnetic vibratory sieve shaker D0407.2 (available from Controlab, France).

In the method described herein, a portion of the largest particles (i.e. a coarse fraction) of the ground mica material (e.g. wet ground mica material) is removed by classification (e.g. by air classification or by sieving). Thus, the ground mica material (e.g. wet ground mica material) of the present invention comprises (e.g. consists essentially of, or consists of) the fine mica particles that remain after larger particles are removed.

In other words, the ground mica material (e.g. wet ground mica material) can be classified to split the material into two fractions. The fine fraction is the mica particulate of the present invention. The coarse fraction may be considered a by-product.

The proportion of larger particles that are removed can be selected depending on the target particle size distribution for the mica particulate. For example, from about 10 wt. % to about 99.5 wt. %, for example, from about 10 wt. % to about 99 wt. %, or from about 10 wt. % to about 95 wt. %, or from about 20 wt. % to about 99.5 wt. %, or from about 20 wt. % to about 99 wt. %, or from about 20 wt. % to about 95 wt. %, or from about 30 wt. % to about 99.5 wt. %, or from about 30 wt. % to about 99 wt. %, or from about 30 wt. % to about 95 wt. %, or from about 40 wt. % to about 99.5 wt. %, or from about 40 wt. % to about 99 wt. %, or from about 40 wt. % to about 95 wt. %, or from about 50 wt. % to about 99.5 wt. %, or from about 50 wt. % to about 99 wt. %, or from about 50 wt. % to about 95 wt. %, or from about 60 wt. % to about 99.5 wt. %, or from about 60 wt. % to about 99 wt. %, or from about 60 wt. % to about 95 wt. %, or from about 70 wt. % to about 99.5 wt. %, or from about 70 wt. % to about 99 wt. %, or from about 70 wt. % to about 95 wt. %, or from about 80 wt. % to about 99.5 wt. %, or from about 80 wt. % to about 99 wt. %, or from about 80 wt. % to about 95 wt. %, or from about 80 w. % to about 90 wt. %, or from about 90 wt. % to about 99.5 wt. %, or from about 90 wt. % to about 99 wt. %, or from about 90 wt. % to about 95 wt. %, of the largest particles may be removed to make the mica particulate.

When classified by air classification, the amount of the fine fraction produced may be directly correlated to the speed of the classifying turbine. The faster the classifier speed, the smaller the fine product yield (%). The faster the classifier speed, the lower the top cut (e.g. $d_{95}$ or $d_{98}$) of the fine fraction. Thus, the speed of the classifying turbine can be adjusted depending on the desired particle size and product yield.

The classifying turbine may be operated with a peripheral speed of no less than about 25 m/s, for example, no less than about 50 m/s. The classifying turbine may be operated with a peripheral speed of no greater than about 100 m/s, for example, no greater than about 75 m/s. The classifying turbine may be operated with a peripheral speed from about 25 m/s to about 100 m/s, for example, from about 25 m/s to about 75 m/s, or from about 50 m/s to about 100 m/s, or from about 50 m/s to about 75 m/s.

The classifying turbine may be operated at a speed no less than about 1000 rpm, for example, no less than about 2000 rpm, or no less than about 3000 rpm, or no less than about 4000 rpm, or no less than about 5000 rpm, or no less than about 6000 rpm, or no less than about 7000 rpm, or no less than about 8000 rpm. The classifying turbine may be operated at a speed no greater than about 15000 rpm, for example, no greater than about 14000 rpm, or no greater than about 13000 rpm, or no greater than about 12000 rpm, or no greater than about 11000 rpm, or no greater than about 10000 rpm, or no greater than about 9000 rpm, or no greater than about 8000 rpm, or no greater than about 7000 rpm, or no greater than about 6000 rpm, or no greater than about 5000 rpm, or no greater than about 4000 rpm. The classifying turbine may be operated at a speed from about 1000 rpm to about 15000 rpm, for example, from about 2000 rpm to about 14000 rpm, or from about 3000 rpm to about 13000 rpm, or from about 4000 rpm to about 12000 rpm, or from about 4000 rpm to about 11000 rpm, or from about 4000 rpm to about 10000 rpm, or from about 4000 rpm to about 9000 rpm, or from about 5000 rpm to about 10000 rpm, or from about 5000 rpm to about 9000 rpm, or from about 6000 rpm to about 10000 rpm, or from about 6000 rpm to about 9000 rpm, or from about 1000 rpm to about 5000 rpm, or from about 2000 rpm to about 4000 rpm, or from about 3000 rpm to about 4000 rpm.

The classifying turbine may be operated with a fines yield of no less than about 3%, for example, no less than about 4%, or no less than about 5%, or no less than about 6%, or no less than about 7%, or no less than about 8%, or no less than about 9%, or no less than about 10%. The classifying turbine may be operated with a fines yield of no more than about 20%, for example, no more than about 15%, or no more than about 12%, or no more than about 11%. The classifying turbine may be operated with a fines yield from about 3% to about 20%, for example, from about 4% to about 15%, or from about 5% to about 12%, or from about 6% to about 12%, or from about 7% to about 11%.

When classified by sieving, the amount of the fine fraction produced may depend on the (i.e. maximum) mesh opening size (i.e. diameter) of the sieve used. The method may comprise sieving the ground mica material (e.g. the wet ground mica material) using a sieve having a maximum mesh opening size (i.e. diameter) of no greater than about 500 μm, for example, no greater than about 200 μm, or no greater than about 150 μm, or no greater than about 125 μm, or no greater than about 100 μm, or no greater than about 75 μm, or no greater than about 50 μm.

Classification typically reduces the topcut, e.g. $d_{95}$ (whether by laser or by sedigraph), of the ground mica material (e.g. the wet ground mica material). Classification also typically reduces the $d_{75}$, $d_{50}$ and/or $d_{25}$ (whether by laser or by sedigraph) of the ground mica material (e.g. the wet ground mica material). Classification may also assist in removing impurities from the ground mica material (e.g. the wet ground mica material). Removal of impurities may increase the whiteness, such as the Minolta Y whiteness, of the ground mica material (e.g. the wet ground mica material).

The method may include preparing the ground mica material (e.g. the wet ground mica material) prior to classification. Accordingly, the method may comprise: (e.g. wet) grinding a mica feed material to produce the ground mica material (e.g. the wet ground mica material); and classifying the ground mica material (e.g. the wet ground mica material) to remove the coarse fraction.

The mica feed material may be (e.g. wet) milled using a (e.g. wet) pan mill. Wet grinding may be used because it typically preserves particle shape and may produce mica particles having a higher lamellarity index.

The method may comprise increasing the BET specific surface area of the ground mica material. For example, the method may comprise increasing the BET specific surface area of the ground mica material by no less than about 0.5 $m^2/g$, for example, no less than about 1.0 $m^2/g$, or no less than about 5.0 $m^2/g$ (relative to the BET specific surface area of the ground mica material prior to classification). The method may comprise increasing the BET specific surface area of the ground mica material by no less than about 10%, for example, by no less than about 20%, or by no less than about 50%, or by no less than about 100% (relative to the BET specific surface area of the ground mica material prior to classification).

The method may comprise reducing the $d_{95}$, by sedigraph, of the ground mica material. For example, the method may comprise reducing the $d_{95}$, by sedigraph, of the ground mica material by no less than about 5 μm, for example, no less than about 7 μm, or no less than about 10 μm (relative to the BET specific surface area of the ground mica material prior to classification). The method may comprise reducing the $d_{95}$, by sedigraph, of the ground mica material by no less than about 10%, for example, no less than about 20%, or no less than about 30%, or no less than about 40%.

The method may comprise reducing the $d_{95}$, by laser, of the ground mica material. For example, the method may comprise reducing the $d_{95}$, by laser, of the ground mica material by no less than about 10 μm, for example, no less than about 20 μm, or no less than about 30 μm, or no less than about 40 μm (relative to the BET specific surface area of the ground mica material prior to classification). The method may comprise reducing the $d_{95}$, by laser, of the ground mica material by no less than about 10%, for example, no less than about 20%, or no less than about 30%, or no less than about 40%.

The method may comprise reducing the $d_{50}$, by sedigraph, of the ground mica material. For example, the method may comprise reducing the $d_{50}$, by sedigraph, of the ground mica material by no less than about 0.5 μm, for example, no less than about 1.0 μm, or no less than about 2.0 μm, or no less than about 3.0 μm (relative to the BET specific surface area of the ground mica material prior to classification). The method may comprise reducing the $d_{50}$, by sedigraph, of the ground mica material by no less than about 5%, for example, no less than about 10%, or no less than about 20%, or no less than about 30%.

The method may comprise reducing the $d_{50}$, by laser, of the ground mica material. For example, the method may comprise reducing the $d_{50}$, by laser, of the ground mica material by no less than about 5 μm, for example, no less than about 10 μm, or no less than about 15 μm, or no less than about 20 μm (relative to the BET specific surface area of the ground mica material prior to classification). The method may comprise reducing the $d_{50}$, by sedigraph, of the ground mica material by no less than about 10%, for example, no less than about 15%, or no less than about 20%, or no less than about 30%, or no less than about 40%.

Ground Mica Material Prior to Classification

The ground mica material (e.g. wet ground mica material) may have a BET specific surface area less than about 5.0 $m^2/g$, for example, no greater than about 4.9 $m^2/g$, or no greater than about 4.5 $m^2/g$, or no greater than about 4.3 $m^2/g$, or no greater than about 4.2 $m^2/g$. The ground mica material (e.g. wet ground mica material) may have a BET specific surface area no less than about 1.0 $m^2/g$, for example, no less than about 2.0 $m^2/g$, or no less than about 3.0 $m^2/g$, or no less than about 4.0 $m^2/g$. The ground mica material (e.g. wet ground mica material) may have a BET specific surface area from about 1.0 $m^2/g$ to less than about 5.0 $m^2/g$, for example, from about 1.0 $m^2/g$ to about 4.9 $m^2/g$, or from about 1.0 $m^2/g$ to about 4.5 $m^2/g$, or from about 1.0 $m^2/g$ to about 4.3 $m^2/g$, or from about 1.0 $m^2/g$ to about 4.2 $m^2/g$, or from about 2.0 $m^2/g$ to less than about 5.0 $m^2/g$, or from about 2.0 $m^2/g$ to about 4.9 $m^2/g$, or from about 2.0 $m^2/g$ to about 4.5 $m^2/g$, or from about 2.0 $m^2/g$ to about 4.3 $m^2/g$, or from about 2.0 $m^2/g$ to about 4.2 $m^2/g$, or from about 3.0 $m^2/g$ to less than about 5.0 $m^2/g$, or from about 3.0 $m^2/g$ to about 4.9 $m^2/g$, or from about 3.0 $m^2/g$ to about 4.5 $m^2/g$, or from about 3.0 $m^2/g$ to about 4.3 $m^2/g$, or from about 3.0 $m^2/g$ to about 4.2 $m^2/g$, or from about 4.0 $m^2/g$ to less than about 5.0 $m^2/g$, or from about 4.0 $m^2/g$ to about 4.9 $m^2/g$, or from about 4.0 $m^2/g$ to about 4.5 $m^2/g$, or from about 4.0 $m^2/g$ to about 4.3 $m^2/g$, or from about 4.0 $m^2/g$ to about 4.2 $m^2/g$.

The ground mica material (e.g. wet ground mica material) may have a lamellarity index no less than about 2.5, for example, no less than about 3.5, or no less than about 4.0, or no less than about 4.5. The ground mica material (e.g. wet ground mica material) may have a lamellarity index no greater than about 7.0, for example, no greater than about 6.5, or no greater than about 6.0, or no greater than about 5.5. The ground mica material (e.g. wet ground mica material) may have a lamellarity index from about 2.5 to about 7.0, for example, from about 2.5 to about 6.5, or from about 2.5 to about 6.0, or from about 2.5 to about 5.5, or from about 3.5 to about 7.0, or from about 3.5 to about 6.5, or from about 3.5 to about 6.0, or from about 3.5 to about 5.5, or from about 4.0 to about 7.0, or from about 4.0 to about 6.5, or from about 4.0 to about 6.0, or from about 4.0 to about 5.5, or from about 4.5 to about 7.0, or from about 4.5 to about 6.5, or from about 4.5 to about 6.0, or from about 4.5 to about 5.5.

The ground mica material (e.g. wet ground mica material) may have a $d_{95}$, by sedigraph, from about 10 μm to about 100 μm, for example, from about 15 μm to about 50 μm, or from about 15 μm to about 30 μm, or from about 15 μm to about 20 μm. The ground mica material (e.g. wet ground mica material) may have a $d_{75}$, by sedigraph, from about 5 μm to about 50 μm, for example, from about 5 μm to about 25 μm, or from about 5 μm to about 20 μm, or from about 5 μm to about 15 μm, or from about 8 μm to about 12 μm. The ground mica material (e.g. wet ground mica material) may have a $d_{50}$, by sedigraph, from about 1 μm to about 20 μm, for example, from about 1 μm to about 15 μm, or from about 1 μm to about 10 μm, or from about 2 μm to about 7 μm, or from about 5 μm to about 6 μm. The ground mica material (e.g. wet ground mica material) may have a $d_{25}$, by sedigraph, from about 1 μm to about 10 μm, for example, from about 1 μm to about 6 μm, or from about 1 μm to about 4 μm, or from about 2 μm to about 3 μm.

The ground mica material (e.g. wet ground mica material) may have a $d_{95}$, by laser, from about 30 μm to about 300 μm, for example, from about 30 μm to about 150 μm, or from about 70 μm to about 100 μm, or from about 80 μm to about 90 μm. The ground mica material (e.g. wet ground mica material) may have a $d_{75}$, by laser, from about 20 μm to about 100 μm, for example, from about 30 μm to about 90 μm, or from about 40 μm to about 70 μm, or from about 40 μm to about 60 μm, or from about 45 μm to about 55 μm. The ground mica material (e.g. wet ground mica material) may have a $d_{50}$, by laser, from about 10 μm to about 60 μm, for example, from about 10 μm to about 50 μm, or from about 20 μm to about 40 μm, or from about 30 μm to about 35 μm. The ground mica material (e.g. wet ground mica material) may have a $d_{25}$, by laser, from about 5 μm to about 50 μm, for example, from about 10 μm to about 40 μm, or from about 10 μm to about 30 μm, or from about 15 μm to about 25 μm, or from about 18 μm to about 21 μm.

The ground mica material (e.g. wet ground mica material) may have a Minolta Y whiteness no less than about 70, for example, no less than about 80, or from about 70 to about 85, or from about 70 to about 83, or from about 80 to about 83.

The ground mica material (e.g. wet ground mica material) may have a shape factor no less than about 100.

The ground mica material (e.g. wet ground mica material) may have: (a) a BET specific surface area less than about 5.0 $m^2/g$, for example, from about 1.0 $m^2/g$ to about 4.9 $m^2/g$; (b) a $d_{95}$, by sedigraph, from about 10 μm to about 100 μm, for example, from about 15 μm to about 50 μm, or from about 15 μm to about 30 μm; (c) a $d_{75}$, by sedigraph, from about 5 μm to about 50 μm, for example, from about 5 μm to about 25 μm, or from about 5 μm to about 20 μm; (d) a $d_{50}$, by sedigraph, from about 1 μm to about 20 μm, for example, from about 1 μm to about 15 μm, or from about 1 μm to about 10 μm; (e) a $d_{25}$, by sedigraph, from about 1 μm to about 10 μm, for example, from about 1 μm to about 6 μm, or from about 1 μm to about 4 μm; (f) a $d_{95}$, by laser, from about 30 μm to about 300 μm, for example, from about 30 μm to about 150 μm, or from about 70 μm to about 100 μm; (g) a $d_{75}$, by laser, from about 20 μm to about 100 μm, for example, from about 30 μm to about 90 μm, or from about 40 μm to about 70 μm; (h) a $d_{50}$, by laser, from about 10 μm to about 60 μm, for example, from about 10 μm to about 50 μm, or from about 20 μm to about 40 μm; (i) a $d_{25}$, by laser, from about 5 μm to about 50 μm, for example, from about 10 μm to about 40 μm, or from about 10 μm to about 30 μm; (j) a lamellarity index from about 2.5 to about 7.0, for example, from about 3.5 to about 6.5; (k) a Minolta Y whiteness no less than about 70, for example, from about 70 to about 85; and/or (l) a shape factor no less than about 100.

The ground mica material (e.g. wet ground mica material) may have: (a) a BET specific surface area less than about 5.0 $m^2/g$, for example, from about 1.0 $m^2/g$ to about 4.9 $m^2/g$; (b) a $d_{95}$, by sedigraph, from about 10 μm to about 100 μm, for example, from about 15 μm to about 50 μm, or from about 15 μm to about 30 μm; (c) a $d_{75}$, by sedigraph, from about 5 μm to about 50 μm, for example, from about 5 μm to about 25 μm, or from about 5 μm to about 20 μm; (d) a $d_{50}$, by sedigraph, from about 1 μm to about 20 μm, for example, from about 1 μm to about 15 μm, or from about 1 μm to about 10 μm; (e) a $d_{25}$, by sedigraph, from about 1 μm to about 10 μm, for example, from about 1 μm to about 6 μm, or from about 1 μm to about 4 μm; (f) a $d_{95}$, by laser, from about 30 μm to about 300 μm, for example, from about 30 μm to about 150 μm, or from about 70 μm to about 100 μm; (g) a $d_{75}$, by laser, from about 20 μm to about 100 μm, for example, from about 30 μm to about 90 μm, or from about 40 μm to about 70 μm; (h) a $d_{50}$, by laser, from about 10 μm to about 60 μm, for example, from about 10 μm to about 50 μm, or from about 20 μm to about 40 μm; (i) a $d_{25}$, by laser, from about 5 μm to about 50 μm, for example, from about 10 μm to about 40 μm, or from about 10 μm to about 30 μm; (j) a lamellarity index from about 2.5 to about 7.0, for example, from about 3.5 to about 6.5; (k) a Minolta Y whiteness no less than about 70, for example, from about 70 to about 85; and (l) a shape factor no less than about 100.

It may be that the majority of the ground mica material (e.g. wet ground mica material) consists of muscovite. The ground mica material (e.g. wet ground mica material) may comprise no less than about 50 wt. %, for example, no less than about 60 wt. %, or no less than about 70 wt. %, or no less than about 80 wt. %, or no less than about 90 wt. %, or no less than about 95 wt. %, or no less than about 99 wt. %, for example, about 100 wt. %, muscovite, based on the total weight of the ground mica material (e.g. wet ground mica material). The ground mica material (e.g. wet ground mica material) may consist essentially of, or consist of, muscovite. The ground mica material (e.g. wet ground mica material) may be ground muscovite (e.g. wet ground muscovite).

Polymer Composition

The mica particulates described herein may be used as a filler in a polymer composition. The mica particulate may be used as an extender filler or a functional filler. As used herein, the term "functional filler" is understood to mean an additive incorporated into a polymeric composition with a view to enhancing one or more of its physical (e.g., mechanical) properties. An "extender filler" typically modifies the properties of the polymer composition very little and essentially serves to reduce cost. Thus, there is also provided herein a polymer composition comprising a mica particulate as described herein.

In certain embodiments, the mica particulate may be used as a functional filler in a polymer composition, for example, to modify or enhance one or more mechanical properties of the polymer composition.

In certain embodiments, the mica particulate is used as an extender filler, for example, to supplement or supplant other filler materials, which may be more expensive or more difficult to incorporate into the polymer composition.

In certain embodiments, the mica particulate functions as both an extender filler and as a functional filler.

The polymer composition may comprise no less than about 5 wt. %, for example, no less than about 10 wt. %, or no less than about 15 wt. %, or no less than about 20 wt. %, or no less than about 30 wt. %, or no less than about 40 wt. %, of the mica particulate (based on the total weight of the polymer composition). The polymer composition may comprise no more than about 50 wt. %, for example, no more than about 40 wt. %, or no more than about 30 wt. %, or no more than about 25 wt. %, or no more than about 20 wt. %, of the mica particulate (based on the total weight of the polymer composition). The polymer composition may comprise from about 5 wt. % to about 50 wt. %, for example, from about 5 wt. % to about 40 wt. %, or from about 5 wt. % to about 30 wt. %, or from about 5 wt. % to about 25 wt. %, or from about 5 wt. % to about 20 wt. %, from about 10 wt. % to about 50 wt. %, or from about 10 wt. % to about 40 wt. %, or from about 10 wt. % to about 30 wt. %, or from about 10 wt. % to about 25 wt. %, or from about 10 wt. % to about 20 wt. %, or from about 15 wt. % to about 50 wt. %, or from about 15 wt. % to about 40 wt. %, or from about 15 wt. % to about 30 wt. %, or from about 15 wt. % to about 25 wt. %, or from about 15 wt. % to about 20 wt. %, or from about 20 wt. % to about 50 wt. %, or from about 20 wt. % to about 40 wt. %, or from about 20 wt. % to about 30 wt. %, or from about 20 wt. % to about 25 wt. %, or from about 30 wt. % to about 50 wt. %, or from about 30 wt. % to about 40 wt. %, or from about 40 wt. % to about 50 wt. %, mica particulate (based on the total weight of the polymer composition).

The polymer composition may comprise filler other than the mica particulate. For example, the polymer composition may comprise one or more minerals other than the mica particulate. For example, the polymer composition may comprise talc, chlorite, synthetic silica or silicates (e.g. precipitated silica or silicates), natural silica or silicates, a clay mineral (for example, a hydrous kandite clay such as kaolin, halloysite or ball clay), carbon black, an alkaline earth metal carbonate or sulphate, such as calcium carbonate, magnesium carbonate, dolomite, gypsum, an anhydrous (calcined) kandite clay such as metakaolin or fully calcined kaolin, perlite, feldspars, nepheline syenite, wollastonite, diatomaceous earth, barite and/or glass.

The filler compounds other than the mica particulate may be included during preparation of the polymer composition, or alternatively, during preparation of the mica particulate, e.g., the mica particulate may be mixed and blended with the other filler compound(s), and optionally combined with surface treatment agent.

In certain embodiments, the amount of other filler compound(s) is present in amount less than about 10 wt. %, for example, less than about 5 wt. %, or less than about 1 wt. %, or less than about 0.5 wt. %, or less than about 0.1 wt. %.

The polymer composition may comprise any natural or synthetic polymer or mixture thereof. The polymer may, for example, be thermoplastic or thermoset. The term "polymer" used herein includes homopolymers and/or copolymers, as well as crosslinked and/or entangled polymers.

The term "precursor" as may be applied to the polymer component will be readily understood by one of ordinary skill in the art. For example, suitable precursors may include one or more of: monomers, cross-linking agents, curing systems comprising cross-linking agents and promoters, or any combination thereof. Where the mica particulate is mixed with precursors of the polymer, the polymer composition will subsequently be formed by curing and/or polymerising the precursor components to form the desired polymer.

Polymers, including homopolymers and/or copolymers, comprised in the polymer composition of the present invention may be prepared from one or more of the following monomers: acrylic acid, methacrylic acid, methyl methacrylate, and alkyl acrylates having 1-18 carbon atoms in the alkyl group, styrene, substituted styrenes, divinyl benzene, diallyl phthalate, butadiene, vinyl acetate, acrylonitrile, methacrylonitrile, maleic anhydride, esters of maleic acid or fumaric acid, tetrahydrophthalic acid or anhydride, itaconic acid or anhydride, and esters of itaconic acid, with or without a cross-linking dimer, trimer, or tetramer, crotonic acid, neopentyl glycol, propylene glycol, butanediols, ethylene glycol, diethylene glycol, dipropylene glycol, glycerol, cyclohexanedimethanol, 1,6 hexanediol, trimethyolpropane, pentaerythritol, phthalic anhydride, isophthalic acid, terephthalic acid, hexahydrophthalic anyhydride, adipic acid or succinic acids, azelaic acid and dimer fatty acids, toluene diisocyanate and diphenyl methane diisocyanate.

The polymer may be selected from one or more of polymethylmethacrylate (PMMA), polyacetal, polycarbonate, polyvinyls, polyacrylonitrile, polybutadiene, polystyrene, polyacrylate, polyethylene, polypropylene, epoxy polymers, unsaturated polyesters, polyurethanes, polycyclopentadienes and copolymers thereof. Suitable polymers also include liquid rubbers, such as silicones.

In certain embodiments, the polymer composition comprises (e.g. the polymer content of the polymer composition is) an elastomer such as a synthetic rubber or a natural rubber, for example, a styrene-butadiene rubber.

The polymers which may be used in accordance with the invention are advantageously thermoplastic polymers. Thermoplastic polymers are those which soften under the action of heat and harden again to their original characteristics on cooling, that is, the heating-cooling cycle is fully reversible. By conventional definition, thermoplastics are straight and branched linear chain organic polymers with a molecular bond. Examples of polymers which may be used in accordance with the invention include, but are not limited to polyethylene, for example, linear low density polyethylene (LLDPE) and medium density grades thereof, high density polyethylene (HDPE), low density polyethylene (LDPE), polypropylene (PP), polyethylene terephthalate (PET), vinyl/polyvinyl chloride (PVC), polystyrene, polyamide polymers (e.g. nylon), polycarbonates, and mixtures thereof.

In certain embodiments, the polymer is a polyolefin (i.e. polyalkylene or polyalkene) polymer, for example, polyethylene, polypropylene, polybutylene, or a copolymer of two or more of ethylene, propylene and butylene monomers, for example, an ethylene-propylene copolymer. In certain embodiments, the polymer is a mixture of two or more of polypropylene, polyethylene and ethylene-propylene copolymer, for example a mixture of polypropylene and polyethylene.

In certain embodiments, the polymer comprises, consists essentially of, or consists of polypropylene or polyethylene or a mixture of polypropylene and polyethylene. In certain embodiments, the polymer is polypropylene.

In certain embodiments, the polymer is a polyamide polymer, for example an aliphatic polyamide polymer such as nylon.

In certain embodiments, the polymer composition comprises a thermoplastic polyolefin polymer (such as polyethylene and/or polypropylene) and/or a thermoplastic polyamide polymer.

The polymer composition may further comprise one or more additives. The one or more additives may be selected from: thickeners, emulsifiers, viscosity modifiers, softeners, plasticizers (such as polyethylene glycol), antioxidants (e.g. phenolic antioxidants), heat stabilizers, activators (such as zinc oxide), accelerators (such as 2-mercaptobenzothiazole (MBT), mercaptobenzothiazole disulfide (MBTS) or tetramethylthiuram disulfide (DTMT)), rubber process oils (such as naphthenic oil), fire retardants (such as aluminium hydroxide), antibacterial agents, anti-mould agents (such as propionic acid), hydrophobic agents (such as silicone oil), stearic acid or salts thereof (e.g. calcium stearate), sulfur, and/or thermal conductivity regulating agents (such as graphite), or any combination thereof. The polymer composition may comprise no more than about 5 wt. %, for example, no more than about 4 wt. %, or no more than about 3 wt. %, or no more than about 2 wt. %, or no more than about 1 wt. %, or no more than about 0.5 wt. %, of such additives in total.

The presence of the mica particulate in the polymer composition may increase the impact strength of the polymer composition. The presence of the mica particulate in the polymer composition may increase, maintain or reduce the flexural modulus of the polymer composition. The precise impact strength and flexural modulus of the polymer composition may vary depending on the exact polymer used and any other components in the polymer composition.

The polymer composition may have an impact strength which is at least about 1.0% greater, for example, at least about 5.0% greater, or at least about 10% greater, or at least about 11% greater, or at least about 14% greater, or at least about 20% greater, or at least about 30% greater, than the impact strength of a polymer composition that is identical except that it does not comprise the mica particulate of the present invention. The polymer composition may have an impact strength which is no greater than about 100% greater, for example, no greater than about 50% greater, or no greater than about 40% greater, or no greater than about 30% greater, or no greater than about 20% greater, or no greater than about 15% greater, than the impact strength of a polymer composition that is identical except that it does not comprise the mica particulate of the present invention. The polymer composition may have an impact strength which is from about 1.0% to about 100% greater, for example, from about 1.0% to about 50% greater, or from about 5% to about 50% greater, or from about 5% to about 40% greater, or from about 5% to about 15% greater, or from about 10% to about 15% greater, or from about 11% to about 15% greater, or from about 14% to about 20% greater, or from about 14% to about 15% greater, or from about 30% to about 50% greater, or from about 30% to about 40% greater, than the impact strength of a polymer composition that is identical except that it does not comprise the mica particulate of the present invention.

Impact strength may refer to Charpy impact strength or falling weight impact strength as described herein.

Charpy impact strength (in $kJ/m^2$) (unnotched flatwise and normal impact) may be measured on 80 mm by 10 mm by 4 mm bars according to ISO 179-1 at −20° C. Falling weight index (J) at −21° C. may be measured on 60*60*3 mm plaques according to EN ISO 6603:2.

Flexural modulus may be measured on 80 mm by 10 mm by 4 mm bars according to ISO 178 (span between specimen supports=64 mm, test speed=1 mm/s, flexural strain=0.3% max, measured on at least 7 specimens).

The polymer composition may have a Charpy impact strength of no less than about 10 $kJ/m^2$, for example, no less than about 15 $kJ/m^2$, or no less than about 18 $kJ/m^2$, or no less than about 20 $kJ/m^2$, or no less than about 21 $kJ/m^2$, or no less than about 25 $kJ/m^2$. The polymer composition may have a Charpy impact strength of no more than about 50 $kJ/m^2$, for example, no more than about 40 $kJ/m^2$, or no more than about 30 $kJ/m^2$, or no more than about 26 $kJ/m^2$, or no more than about 22 $kJ/m^2$. The polymer composition may have a Charpy impact strength of from about 10 $kJ/m^2$ to about 50 $kJ/m^2$, for example, from about 10 $kJ/m^2$ to about 40 $kJ/m^2$, or from about 10 $kJ/m^2$ to about 30 $kJ/m^2$, or from about 10 $kJ/m^2$ to about 26 $kJ/m^2$, or from about 10 $kJ/m^2$ to about 22 $kJ/m^2$, or from about 15 $kJ/m^2$ to about 50 kJ/m$^2$, or from about 15 kJ/m$^2$ to about 40 kJ/m$^2$, or from about 15 kJ/m$^2$ to about 30 kJ/m$^2$, or from about 15 kJ/m$^2$ to about 26 kJ/m$^2$, or from about 15 kJ/m$^2$ to about 22 kJ/m$^2$, or from about 18 kJ/m$^2$ to about 50 kJ/m$^2$, or from about 18 kJ/m$^2$ to about 40 kJ/m$^2$, or from about 18 kJ/m$^2$ to about 30 kJ/m$^2$, or from about 18 kJ/m$^2$ to about 26 kJ/m$^2$, or from about 18 kJ/m$^2$ to about 22 kJ/m$^2$, or from about 20 kJ/m$^2$ to about 50 kJ/m$^2$, or from about 20 kJ/m$^2$ to about 40 kJ/m$^2$, or from about 20 kJ/m$^2$ to about 30 kJ/m$^2$, or from about 20 kJ/m$^2$ to about 26 kJ/m$^2$, or from about 20 kJ/m$^2$ to about 22 kJ/m$^2$, or from about 21 kJ/m$^2$ to about 50 kJ/m$^2$, or from about 21 kJ/m$^2$ to about 40 kJ/m$^2$, or from about 21 kJ/m$^2$ to about 30 kJ/m$^2$, or from about 21 kJ/m$^2$ to about 26 kJ/m$^2$, or from about 21 kJ/m$^2$ to about 22 kJ/m$^2$, or from about 25 kJ/m$^2$ to about 50 kJ/m$^2$, or from about 25 kJ/m$^2$ to about 40 kJ/m$^2$, or from about 25 kJ/m$^2$ to about 30 kJ/m$^2$.

Additionally or alternatively, the polymer composition may have a flexural modulus no less than about 2000 MPa, for example, no less than about 2500 MPa, or no less than about 2700 MPa, or no less than about 3000 MPa, or no less than about 3200 MPa. The polymer composition may have a flexural modulus no greater than about 7000 MPa, for example, no greater than about 5000 MPa, or no greater than about 4000 MPa, or no greater than about 3500 MPa, or no greater than about 3300 MPa, or no greater than about 3250 MPa, or no greater than about 3100 MPa. The polymer composition may have a flexural modulus from about 2000 MPa to about 7000 MPa, for example, from about 2000 MPa to about 5000 MPa, or from about 2000 MPa to about 4000 MPa, or from about 2000 MPa to about 3500 MPa, or from about 2000 MPa to about 3300 MPa, or from about 2000 MPa to about 3250 MPa, or from about 2500 MPa to about 7000 MPa, or from about 2500 MPa to about 5000 MPa, or from about 2500 MPa to about 4000 MPa, or from about 2500 MPa to about 3500 MPa, or from about 2500 MPa to about 3300 MPa, or from about 2500 MPa to about 3250 MPa, from about 2700 MPa to about 7000 MPa, or from about 2700 MPa to about 5000 MPa, or from about 2700 MPa to about 4000 MPa, or from about 2700 MPa to about 3500 MPa, or from about 2700 MPa to about 3300 MPa, or from about 2700 MPa to about 3250 MPa, or from about 3000 MPa to about 7000 MPa, or from about 3000 MPa to about 5000 MPa, or from about 3000 MPa to about 4000 MPa, or from about 3000 MPa to about 3500 MPa, or from about 3000 MPa to about 3300 MPa, or from about 3000 MPa to about 3250 MPa, or from about 3200 MPa to about 7000 MPa, or from about 3200 MPa to about 5000 MPa, or from about 3200 MPa to about 4000 MPa, or from about 3200 MPa to about 3500 MPa, or from about 3200 MPa to about 3300 MPa, or from about 3200 MPa to about 3250 MPa, or from about 3000 MPa to about 3100 MPa.

The "polymer composition which is identical except that it does not comprise the mica particulate of the present invention" may, for example, be a polymer composition in which the mica particulate of the present invention has been removed and not replaced by another mica particulate. Alternatively, the mica particulate of the present invention may have been removed and replaced with (e.g. the same amount of) a mica particulate not within the present invention, for example a commercial mica particulate such as WG 333 mica. WG 333 mica is a wet ground high-aspect ratio mica having: a $d_{95}$, by sedigraph, of about 18.4 μm; a $d_{50}$, by sedigraph, of about 5.5 μm; a des by laser, of about 87.8 μm; a $d_{50}$, by laser, of about 32.9 μm; a BET specific surface area of about 4.1 m$^2$/g; and a lamellarity of about 5.0.

Method for Making the Polymer Composition

The polymer composition may be prepared by combining a polymer or polymer precursors with the mica particulate of the present invention and any other optional components. Where the mica particulate (and any other optional components) are combined with polymer precursors, the resulting combination of the polymer precursors, mica particulate (and other optional components) may be cured.

The polymer composition can be prepared by mixing of the components thereof (except the mica particulate) intimately together. The mica particulate may then be suitably blended, e.g., dry blended, with the mixture of components and any desired additional components, before processing to form a final polymer composite or article.

The polymer composition may, for example, be in accordance with any embodiment disclosed herein.

Preparation of the polymer compositions of the present invention can be accomplished by any suitable mixing method known in the art, as will be readily apparent to one of ordinary skill in the art. Such methods include, for example, dry blending of the individual components or precursors thereof and subsequent processing in a conventional manner.

Certain of the ingredients can, if desired, be pre-mixed before addition to the compounding mixture.

In the case of thermoplastic polymer compositions, such processing may comprise melt mixing, either directly in an extruder for making an article from the composition, or pre-mixing in a separate mixing apparatus. Dry blends of the individual components can alternatively be directly injection moulded without pre-melt mixing.

The polymer composition can be prepared by mixing of the components thereof intimately together. The mica particulate may then be suitably dry blended with the polymer and any desired additional components, before processing as described above.

Other filler compounds, may be added and blended in at the mixing stage.

For the preparation of cross-linked or cured polymer compositions, the blend of uncured components or their precursors, and, if desired, the mica particulate and any desired non-mica component(s), will be contacted under suitable conditions of heat, pressure and/or light with an effective amount of any suitable cross-linking agent or curing system, according to the nature and amount of the polymer used, in order to cross-link and/or cure the polymer.

For the preparation of polymer compositions where the mica particulate and any desired other component(s) are present in situ at the time of polymerisation, the blend of monomer(s) and any desired other polymer precursors, mica particulate and any other component(s) will be contacted under suitable conditions of heat, pressure and/or light, according to the nature and amount of the monomer(s) used, in order to polymerize the monomer(s) with the mica particulate and any other component(s) in situ.

In certain embodiments, the mica particulate is dispersed with agitation into a mixture comprising polymer (for example, polypropylene) and optionally a curing agent. The mixture may further comprise a mould release agent.

The resulting dispersion can be degassed to remove entrained air. The resulting dispersion can then be poured into a suitable mould and cured. Suitable curing temperatures range from 20-200° C., for example 20-120° C., or, for example, 60-90° C.

The starting polymer mixture can further comprise a pre-polymer (for example, propylene monomer). The pre-polymer may or may not correspond to the starting polymer.

The viscosity of the starting polymer or polymer/monomer solution, amount of curing agent, release agent and mica particulate can be varied according to the requirements of the final cured product. Generally, the greater the amount of mica particulate added, the higher the viscosity of the dispersion. Dispersant agents can be added to reduce the viscosity of the dispersion. Alternatively, the amount of polymer in the starting solution can be reduced.

Suitable curing agents will be readily apparent to one of ordinary skill in the art, and include organic peroxides, hydroperoxides and azo compounds. Examples of peroxide and hydroperoxide curing agents include dimethyl dibutylperoxyhexane, benzyl peroxide, dicumyl peroxide, methyl ethyl ketone peroxide, lauryl peroxide, cyclohexanone peroxide, t-butyl perbenzoate, t-butyl hydroperoxide, t-butyl benzene hydroperoxide, cumene hydroperoxide and t-butyl peroctoate.

The compounded compositions may further comprise additional components, such as slip aids (for example Erucamide), process aids (for example Polybatch® AMF-705), mould release agents and antioxidants.

Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate calcium oleate, zinc palmitate. Typically, slip and process aids, and mould release agents are added in an amount less than about 5 wt. % based on the weight of the masterbatch. Polymer articles may then be extruded, compression moulded or injected moulded using conventional techniques known in the art, as will be readily apparent to one of ordinary skill in the art. Thus, as described below, the present invention is also directed to articles formed from the polymer compositions of the present invention.

In certain embodiments, the polymer composition comprises a colorant which, if present, will be added during compound of the polymer composition. The colorant may be added in the form of a masterbatch. Suitable colours are many and various.

In certain embodiments, mica particulate is added to a twin-screw extruder to which unfilled polymer is being fed and made molten. The mica particulate is fed into the extruder through a hopper, for example, via gravimetric feeding, and uniformly blends with the polymer. The mixture emerges from the extruder and may be cooled. Then, for example, the mixture can be further compression moulded or injection moulded into useful shapes.

The methods described above may include compounding and extrusion. Compounding may be carried out using a twin screw compounder, for example, a Clextral BC 21 double screw extruder or a Leistritz ZSE 18 double screw extruder or Baker Perkins 25 mm twin screw compounder. The polymer, mica particulate and optional additional components may be premixed and fed from a single hopper. The resulting melt may be cooled, for example, in a water bath, and then pelletized. Test pieces, e.g., Charpy bars or tensile dumbbells, may be injection moulded or compression moulded or cast or blown into film.

The screw temperature may be between about 100° C. and about 300° C., for example, between about 150° C. and about 280° C., for example, between about 180° C. and about 250° C., or between about 210 and 250° C.

Screw speed may be between about 100 and 1200 rpm, for example, between about 100 and 1000 rpm, for example, between about 200 and 800 rpm, for example, between about 250 and 650 rpm, for example, between about 200 and 400 rpm, or between about 300 and 600 μm, or between about 400 and 600 rpm, or between about 500 and 700 rpm. In certain embodiments, screw speed is about 300 rpm. In other embodiments, the screw speed is about 400 rpm. In other embodiments, the screw speed is about 500 rpm. In other embodiments, screw speed is about 600 rpm.

Suitable injection molding apparatus includes, for example, a Billion 50T Proxima press. The polymer composition may be dried prior to molding. Drying may be carried out at any suitable temperature, for example, about 60° C., for a suitable period of time, for example, between about 1 hours and 20 hours, for example, between about 2 and 18 hours, or between about 1 and 3 hours, or between about 4 and 8 hours, or between about 12 and 18 hours. The temperature during drying may be kept constant or varied. In certain embodiments, the temperature during drying is between about 70 and 120° C., for example, between about 80 and 100° C., for example, about 90° C.

Molding is generally conducted at a temperature at which the polymer composition is flowable. For example, the molding temperature may be between about 100 and 300° C., for example, between about 200 and 300° C., or between about 240 and about 280° C. Following molding the molded piece will be allowed to cool and set.

Other suitable processing techniques include gas-assisted injection molding, calendaring, vacuum forming, thermoforming, blow-molding, drawing, spinning, film forming, laminating or any combination thereof. Any suitable apparatus may be used, as will be apparent to one of ordinary skill in the art.

The polymer composition can be processed to form, or to be incorporated in, articles (e.g. articles of commerce) in any suitable way, as described herein. The articles which may be formed from the polymer composition are many and various. Examples include automotive body parts and panels, for example, a bonnet (hood), wing piece, wing-mirror casing, door (front and/or rear), tail gate and bumper (front and/or rear). In some examples, the polymer composition is not provided in the form of a film. For example, it may be that the article is not a film and/or the article does not incorporate the polymer composition as a film or as a film-like coating. In some examples, the article is not coated paper.

Uses of the Mica Particulate

The mica particulate may be used in a polymer composition. For example, the mica particulate may be used to increase the impact strength (e.g. Charpy impact or drop impact strength as described above) of a polymer composition into which it is incorporated. The polymer composition may be in accordance with any embodiment described herein.

The mica particulate may increase the impact strength of the polymer composition relative to the same polymer composition absent the mica particulate of the present invention. The mica particulate may increase the impact strength of the polymer composition relative to the same polymer composition not containing any mica particulate. Alternatively, the mica particulate may increase the impact strength of the polymer composition relative to a polymer composition comprising the same amount of an alternative mica particulate not according to the invention.

The polymer composition can be processed to form, or to be incorporated in, articles of commerce in any suitable way, as described herein. The articles which may be formed from the polymer composition are many and various. Examples include automotive body parts and panels, for example, a bonnet (hood), wing piece, wing-mirror casing, door (front and/or rear), tail gate and bumper (front and/or rear). In some examples, the polymer composition is not provided in the form of a film. For example, it may be that the article is not a film and/or the article does not incorporate the polymer composition as a film or as a film-like coating. In some examples, the article is not coated paper.

It will be understood that the invention is not limited to the embodiments described above and various modifications and improvements can be made without departing from the concepts described herein. Except where mutually exclusive, any of the features may be employed separately or in combination with any other features and the disclosure extends to and includes all combinations and sub-combinations of one or more features described herein.

For the avoidance of doubt, the present application is directed to the subject-matter described in the following numbered paragraphs:

1. A mica particulate having: (a) a BET specific surface area no less than about 4.5 $m^2/g$; and (b) a lamellarity index no less than about 2.5.
2. The mica particulate according to paragraph 1, having one or both of: (a) a $d_{95}$, by laser, no greater than about 150 μm, for example, from about 5 μm to about 150 μm, or from about 40 μm to about 130 μm; and (b) a $d_{95}$, by sedigraph, no greater than about 30 μm, for example, from about 2 μm to about 30 μm, or from about 10 μm to about 30 μm.
3. The mica particulate according to paragraph 1 or paragraph 2, wherein:

(A)

(a) the BET specific surface area is from about 4.5 $m^2/g$ to about 50 $m^2/g$, for example, from about 5.0 $m^2/g$ to about 12 $m^2/g$; and/or (b) the lamellarity index is from about 2.5 to about 6.5, for example, from about 4.0 to about 5.7; or (B)

(a) the BET specific surface area is from about 5.0 $m^2/g$ to about 50 $m^2/g$, for example, from about 5.1 $m^2/g$ to about 50 $m^2/g$; and/or (b) the lamellarity index is no less than about 3.0, for example, no less than about 3.1.

4. The mica particulate according to any preceding paragraph, having: (a) a $d_{50}$, by laser, no greater than about 40 μm, for example, from about 3 μm to about 40 μm, or from about 20 μm to about 40 μm; (b) a $d_{50}$, by sedigraph, no greater than about 6 μm, for example, from about 0.5 μm to about 6 μm, or from about 3.5 μm to about 6 μm; (c) a Minolta Y whiteness no less than about 70, for example, from about 70 to about 88; and/or (d) a PANACEA shape factor from about 100 to about 250, for example, from about 140 to about 180.
5. The mica particulate according to any preceding paragraph, comprising no less than about 90 wt. % muscovite.
6. A method for preparing the mica particulate according to any preceding paragraph, the method comprising classifying a ground mica material, such as a wet ground mica material.
7. The method according to paragraph 6, comprising: (a) classifying the ground mica material using an air classifier operated with a peripheral speed of no less than about 25 m/s, for example, from about 25 m/s to about 100 m/s; or (b) classifying the ground mica material by sieving.
8. The method according to paragraph 6 or paragraph 7, wherein the method further comprises, prior to classification, grinding a mica feed material to produce the ground mica material, optionally wherein the grinding is a wet grinding.
9. The method according to any of paragraphs 6 to 8, wherein the ground mica material has: (a) a BET specific surface area less than about 5.0 $m^2/g$, for example, from about 1.0 $m^2/g$ to about 4.9 $m^2/g$; (b) a $d_{95}$, by sedigraph, from about 10 μm to about 100 μm, for example, from about 15 μm to about 50 μm, or from about 15 μm to about 30 μm; (c) a $d_{75}$, by sedigraph, from about 5 μm to about 50 μm, for example, from about 5 μm to about 25 μm, or from about 5 μm to about 20 μm; (d) a $d_{50}$, by sedigraph, from about 1 μm to about 20 μm, for example, from about 1 μm to about 15 μm, or from about 1 μm to about 10 μm; (e) a $d_{25}$, by sedigraph, from about 1 μm to about 10 μm, for example, from about 1 μm to about 6 μm, or from about 1 μm to about 4 μm; (f) a $d_{95}$, by laser, from about 30 μm to about 300 μm, for example, from about 30 μm to about 150 μm, or from about 70 μm to about 100 μm; (g) a $d_{75}$, by laser, from about 20 μm to about 100 μm, for example, from about 30 μm to about 90 μm, or from about 40 μm to about 70 μm; (h) a $d_{50}$, by laser, from about 10 μm to about 60 μm, for example, from about 10 μm to about 50 μm, or from about 20 μm to about 40 μm; (i) a $d_{25}$, by laser, from about 5 μm to about 50 μm, for example, from about 10 μm to about 40 μm, or from about 10 μm to about 30 μm; (j) a lamellarity index from about 2.5 to about 7.0, for example, from about 3.5 to about 6.5; (k) a Minolta Y whiteness no less than about 70, for example, from about 70 to about 85; and/or (l) a shape factor no less than about 100.
10. A polymer composition comprising the mica particulate according to any of paragraphs 1 to 5, optionally wherein the polymer composition: (a) comprises no less than about 5 wt. %, for example, from about 5 wt. % to about 50 wt. %, or from about 10 wt. % to about 40 wt. %, of the mica particulate; (b) comprises a thermoplastic polymer, for example, a thermoplastic polyalkylene polymer such as polypropylene; (c) has a flexural modulus from about 2000 MPa to about 7000 MPa, for example, from about 2500 MPa to about 3400 MPa, or from about 2700 MPa to about 3250 MPa; and/or (d) has an impact strength no less than about 10 $kJ/m^2$, for example, no less than about 20 $kJ/m^2$, or no less than about 25 $kJ/m^2$.
11. A method of making the polymer composition according to paragraph 10, the method comprising combining a polymer or polymer precursors with the mica particulate according to any of paragraphs 1 to 5.
12. An article formed from the polymer composition according to paragraph 10.
13. Use of a mica particulate according to any of paragraphs 1 to 5 in a polymer composition to increase the impact strength of the polymer composition as compared to a polymer composition comprising the same amount of a mica particulate not according to paragraph 1.
14. A method of increasing the impact strength of a polymer composition, as compared to a reference polymer composition comprising a reference amount of a mica particulate not according to paragraph 1, the method comprising adding the mica particulate according to any of paragraphs 1 to 5 to the polymer composition in the reference amount.
15. The use or method according to paragraph 13 or paragraph 14, wherein the polymer composition: (a) a thermoplastic polymer composition comprising a thermoplastic polymer, for example, a thermoplastic polyolefin polymer, such as polyethylene or polypropylene, or a thermoplastic polyamide polymer; and/or (b) comprises no less than about 5 wt. %, for example, from about 5 wt. % to about 50 wt. %, or from about 10 wt. % to about 40 wt. %, of the mica particulate.

EXAMPLES

Example 1

Four different inventive mica particulates (A, B, C and D) were prepared by classifying two different wet ground mica materials Mica 1 and Mica 2.

Mica 1 is a commercially available wet ground mica (WG 333, available from Imerys Performance Minerals) having the properties summarized in Table 1. Mica 2 is a wet ground mica prepared using a pan mill and having the properties summarized in Table 1. Both Mica 1 and Mica 2 contain 93 wt. % muscovite, as determined by X-ray diffraction using the D8 Advance A25 Bruker by the method described hereinabove.

TABLE 1

| | | Mica 1 | Mica 2 |
|---|---|---|---|
| Sedigraph (μm) | $d_{95}$ | 18.4 | 28.8 |
| | $d_{75}$ | 10.1 | 11.4 |
| | $d_{50}$ | 5.5 | 5.6 |
| | $d_{25}$ | 2.8 | 2.6 |
| Laser (μm) | $d_{95}$ | 87.8 | 125.8 |
| | $d_{75}$ | 51.7 | 62.3 |
| | $d_{50}$ | 32.9 | 36.8 |
| | $d_{25}$ | 19.7 | 20.7 |
| Lamellarity Index | | 5.0 | 5.6 |
| BET specific surface area ($m^2/g$) | | 4.1 | 4.7 |
| Minolta Y whiteness | | 81.9 | 73.9 |

Inventive mica particulates A to C were prepared using Mica 1; inventive mica particulate D was prepared using Mica 2.

To prepare inventive mica particulates A, B and C, the wet ground Mica 1 was classified using a NETZSCH Ecutec BORA 50 turbo air classifier (available from NETZSCH-Feinmahltechnik GmbH, Germany) into a coarse fraction and a fine fraction (the fine fraction being the inventive mica particulate). The NETZSCH Ecutec BORA 50 turbo air classifier has a maximum air flow of 1800 $m^3/h$, a maximum rotor speed of 8700 rpm, an installed power of 10 KW, a feed rate of up to 1800 kg/h and a main fan installed power of 30 KW. The system operating conditions used to prepare each of inventive mica particulates A to C are given in Table 2.

TABLE 2

| | Inventive Mica Particulate A | Inventive Mica Particulate B | Inventive Mica Particulate C |
|---|---|---|---|
| Feed Material | Mica 1 | Mica 1 | Mica 1 |
| NEA speed (rpm) | 3000 | 3200 | 8700 |
| Air flow ($m^3/h$) | 1400 | 1400 | 1200 |
| Secondary air flow ($m^3/h$) | 150 | 150 | 100 |
| Feed rate (kg/h) | 200 | 200 | 200 |

To prepare inventive mica particulate D, the wet ground Mica 2 was sieved using an electromagnetic vibratory sieve shaker D0407.2 (available from Controlab, France) to a top cut ($d_{95}$) of about 105 μm. The D0407.2 sieve shaker ensures ellipsoidal sieving in a horizontal plane, with adjustable vibrations generated by an electromagnet. The shaker includes a controller for switching on the device, programming the sieving time, programming the amplitude of the mechanical oscillations, selecting a continuous mode of sieving or a discontinuous mode of sieving, and adjusting of the duration of the vibratory cycle between two different pause times (in the case of a discontinuous mode of sieving). Inventive mica particulate D was prepared by sieving wet ground Mica 2 using a sieve with a mesh opening size (i.e. diameter) of 125 μm.

The particle size distribution (by both sedigraph and Malvern laser scattering), lamellarity index, BET specific surface area and Minolta Y whiteness were analyzed for each of the inventive mica particulates A to D. The methods for obtaining the particle size distribution and the BET specific surface area are set out in more detail in Examples 2, 3 and 4. Minolta Y whiteness was measured using the Konica Minolta CM-3700d spectrophotometer/colorimeter by the method described hereinabove. The results are shown in Table 3.

TABLE 3

| | | Inventive Mica Particulate A | Inventive Mica Particulate B | Inventive Mica Particulate C | Inventive Mica Particulate D |
|---|---|---|---|---|---|
| Sedigraph (μm) | $d_{95}$ | 11.8 | 10.5 | 2.7 | 24.2 |
| | $d_{75}$ | 6.6 | 5.5 | 1.4 | 10.9 |
| | $d_{50}$ | 4.1 | 3.6 | 0.9 | 5.4 |
| | $d_{25}$ | 2.2 | 1.9 | 0.6 | 2.6 |
| Laser (μm) | $d_{95}$ | 53.6 | 49.7 | 8.9 | 105.6 |
| | $d_{75}$ | 32.1 | 27.8 | 5.1 | 58.6 |
| | $d_{50}$ | 21.1 | 18.1 | 3.2 | 35 |
| | $d_{25}$ | 13.1 | 11.2 | 1.9 | 19.4 |
| Lamellarity Index | | 4.1 | 4.0 | 2.6 | 5.5 |
| BET specific surface area ($m^2/g$) | | 5.0 | 5.0 | 11.2 | 4.6 |
| Minolta Y whiteness | | 83.1 | 83.0 | 84.9 | 73.3 |

Four filled polymer compositions A to D were prepared using inventive mica particulates A to D by the following procedure:

- Compounds were extruded on a twin screw extruder with 18 mm diameter and L/D 48
- One extrusion run
- Extruder temperatures: 240° C. (3 first heating zones), then 220° C.
- Screw speed: 500 rpm
- Output: 10 kg/h
- Vacuum pump: 800 mbar
- 20 wt. % of mica particulate was introduced in the side feeder 2 (150 rpm)
- The polymer was polypropylene (56M10 Sabic®)
- 0.6 wt. % stabilizers added (⅙ Irganox® 1010+⅙ Irganox® PS802+⅙ calcium stearate+½ Luzenac® A20 talc)

Reference polymer compositions 1 and 2 were prepared by the same procedure using Mica 1 and Mica 2, respectively.

The adjusted flexural modulus and Charpy unnotched impact strength of the polymer compositions were determined by the methods described herein (flexural modulus according to ISO norm 178 and Charpy unnotched flatwise and normal impact according to ISO norm 179-1). The adjusted values of the flexural modulus were obtained firstly after having checked the real loading by ashing the compounds and secondly by re-calculating the flexural modulus at the same loading (here 20 wt. %) and considering the flexural modulus of the neat polymer. Flexural modulus versus mica loading being linear.

The results are shown in Table 4.

A result was considered to be valid when the following criteria were met:

the Reynolds number was below 0.3;

the baseline (on the dispersive solution only) was between 125-130 kcounts/s;

the full scale (on the sample suspension) was between 95-105 kcounts/s; and the difference between base/full scale was below 35 kcounts/s.

TABLE 4

| | Polymer Composition 1 | Polymer Composition A | Polymer Composition B | Polymer Composition C | Polymer Composition 2 | Polymer Composition D |
|---|---|---|---|---|---|---|
| Mica particulate | Mica 1 | Inventive Mica Particulate A | Inventive Mica Particulate B | Inventive Mica Particulate C | Mica 2 | Inventive Mica Particulate D |
| Flexural modulus (MPa) | 3284 | 3237 | 3242 | 2782 | 3032 | 3059 |
| Charpy impact strength (kJ/m$^2$) | 18.8 | 21.0 | 21.6 | 26.0 | 17 | 17 |

The flexural modulus and Charpy impact strength for polymer compositions A to C, and the reference polymer composition 1, are plotted as a function of classifier speed in FIG. 1.

It was surprisingly found that the inventive mica particulates A, B and C improved the impact strength of the polymer compositions. It was also surprisingly found that the addition of inventive mica particulates A, B and D did not significantly affect the flexural modulus of the polymer compositions.

Example 2—Method for Determining Particle Size Distribution (by Sedigraph)

The Particle Size Distribution (PSD) was determined using a Sedigraph III from Micromeritics Instruments.

A dispersive solution was prepared by weighing out (using an analytical balance) and fully dissolving (by mechanical stirring) 250 mg of Calgon (sodium metaphosphate) in a beaker containing 1 litre of demineralised water. This step took from 45 to 60 minutes. 1 ml of Triton X (polyethylene glycol octyl phenyl ether) was then added to the solution while stirring for at least 10 minutes. Calgon and Trion X are wetting and dispersing agents.

A sample of mica particulate was prepared for sedigraphic analysis by combining 4.8 g of the mica particulate sample with 80 ml of the dispersive solution. Initially, the mica particulate was combined with a few drops of the 80 ml of dispersive solution in a beaker and the mixture was mixed using a manual stirrer until a paste consistency was achieved. The remainder of the 80 ml of the dispersive solution was then added to the beaker. The beaker was placed in an ultrasonic bath for 30 seconds to remove air bubbles.

Sedigraphic analysis was then carried out on the dispersed sample using the Sedigraph III with the following settings:

Dispersive solution viscosity: 0.7523 mPa·s

Dispersive solution density: 0.9948 g/cm$^3$

Sample density: 2.78 g/cm$^3$ for talc powder

Diameter max.: 52 μm

Diameter min.: 0.4 μm

Mode: high speed

Air bubbles detection: coarse

Example 3—Method for Determining Particle Size Distribution (by Laser Diffraction)

The Particle Size Distribution (PSD) was determined using a Mastersizer 2000 from Malvern instruments.

A sample of mica particulate was prepared for laser diffraction analysis. The required quantity of mica particulate was weighed in a 50 ml beaker. For a mica particulate having a $d_{50}$ (by sedigraph) equal to or greater than 10 μm, a quantity of between 1 g and 2 g of the talc particulate was used. For a mica particulate having a $d_{50}$ (by sedigraph) less than 10 μm, a quantity of between 0.2 g and 0.5 g of the mica particulate was used.

For coarse mica particulates (having a $d_{50}$, by sedigraph, equal to or greater than 10 μm), the sample was combined with absolute ethanol (99.5%) wetting agent. In particular, the powder sample was distributed well at the bottom of the beaker. A few drops of ethanol was added to the powder and mixed using a manual stirrer until a paste consistency was achieved. Between 2 ml and 2.5 ml of ethanol was added to the beaker using a 3 ml disposable pipette and the suspension mixed with the manual stirrer. The beaker was placed in an ultrasonic bath for 30 seconds to remove air bubbles.

Laser diffraction analysis was then carried out on the sample using the Mastersizer 2000 with the following settings:

Sampler: Hydro 2000 G

Measurement theory: Mie 1.589-0.01 (i.e. the talc refractive index)

Water refraction index: 1.33

Measurement range: 0.02-2000 μm

Result calculation model: standard analysis

Number of snaps:

- Duration of measurement: 8 seconds
- Number of snaps per measurement: 8000 snaps
- Background noise time: 8000 snaps
- Background noise snaps: 8 seconds Obscuration limits:

- Low: 5%
- High: 20%

Background noise alarm (value of background noise of detector no 1): below 150 units Measurement parameters of the sampler:

Pump: 1800 rpm

Stirring: 700 rpm

Ultra-sonics: 100%

The analysis was carried out as follows:

First, it was checked that the obscuration lower limit was set to 5% and the obscuration upper limit was set to 20%. The stirrer speed was set to 700 rpm, the pump to 1800 rpm, and the Ultrasonics to 100%. The intensity of the laser was checked. If the intensity of the laser was below 77.5%, the following were checked: that the measurement cell was clean; that there were no air bubbles; and that there was no condensation on the measurement cell windows.

The background noise was measured and the intensity of the lasers (red and blue) was measured. Once the lasers were aligned, the intensity of the lasers and the intensity of the background noise (which must be in continuous decline from detector no 1 to detector no 51) was checked.

A 2 ml sample was taken from the beaker containing the mica particulate suspension using a disposable pipette and added, drop by drop, into the measurement cell until the required obscuration was obtained: for products with a $d_{50}$ (by sedigraph) greater than or equal to 10 μm, measurement with an obscuration of between 15 and 20% was used; for products with a $d_{50}$ (by sedigraph) below 10 μm, measurement an obscuration of between 5 and 12% was used. The suspension was homogenised in the cell for about 60 seconds.

The software directly traces the PSD curve expressed as a percentage of fines. The curve validity is controlled by the value of the weighted residual, the signal-to-noise ratio and the distribution of the luminous intensity of the background noise as a function of detectors. The result obtained is valid so long as the weighted residue is below 1.5% and there are no anomalies in the curve. The intensities of the measurement signal and the background noise on the detectors can be consulted using the data report tab. The intensity of the background noise must steadily decline from detector no 1 to detector no 51. The intensity of the measurement signal must be significantly greater than that of the background noise. The intensity of the background noise depends on how clean the cell is. The intensity of the signal depends mainly on the sample concentration (i.e. on the obscuration).

It has been found that a number of problems may arise, such as air bubbles or condensation in the measurement cell, if the pressure is too high or the water temperature is too cold. In order to avoid such problems, it is recommended to install a filtration system to improve water cleanliness and reduce its pressure, and to install a mixer tap to regulate the water temperature between 20 and 25° C. before the tank is supplied. It is also recommended that the optical bench (lasers) is never switched off

Example 4—Method for Determining BET Specific Surface Area

The BET specific surface area was determined using a method based on the standard NF X 11-621 titled "Détermination de l'aire massique (surface spécifique) des poudres par adsorption de gaz—Méthode B.E.T.—Mesure volumétrique par adsorption d'azote à basse température" (Determination of mass area (specific surface) of powders by gas adsorption—BET Methods—Volumetric measurement by nitrogen adsorption at low temperature).

The method made use of a Micromeritics measurement apparatus (available from Micromeritics Instrument Corp., USA) including a vacuum pump, a VacPrep 061 degassing section, a Tristar 3000S measurement section and sample holders, a Mettler AG204 scale with a precision of 0.1 mg, Dewar flasks, nitrogen adsorbent gas and helium carrier gas.

The sample was weighed (to 0.1 mg accuracy) near the empty sample holder and its mass $M_0$ was recorded in g. The previously homogenised powder sample was then introduced, using a funnel, into the sample holder. Sufficient space (dead volume) was left between the sample and the top of the sample holder to enable free circulation of gas. The sample holder was placed into one of the degassing stations and degassed at 250° C. under a primary vacuum of 10 Pa for about 20 minutes. After degassing, a sufficient volume of nitrogen was added to the sample holder to avoid introducing air during transfer of the sample holder from the degassing station to the measurement station.

The sample holder was then attached to the measurement station and a Dewar flask containing liquid nitrogen was placed around the sample holder. The BET measurement was commenced using the device control software. The device then carried out the following operations automatically:

Vacuum removal of the nitrogen introduced for the transfer of the sample holder;

Leak test;

Adding helium carrier gas;

Measuring the dead volume at ambient temperature;

Measuring the cold dead volume using liquid nitrogen;

Helium vacuum removal;

Leak test;

Adding nitrogen at 950 mm Hg and measuring the saturation pressure; and

Acquisition of analysis values.

The instrument's data acquisition and processing software plotted the transformed BET line from 5 measured adsorption points. The Dewar flask and then the sample holder were removed. The apparatus was allowed to return to ambient temperature and then the sample was again weighed (to an accuracy of 0.1 mg) near the sample holder and the weight was recorded as $M_2$ in g. The mass of the test portion of the sample, M, was calculated (in g) according to:

$$M = M_2 - M_0$$

The value M was then introduced into the software calculation program which automatically calculated the BET specific surface area of the sample in $m^2/g$.

The invention claimed is:

1. A mica particulate having:

(a) a BET specific surface area no less than about 4.5 $m^2/g$; and (b) a lamellarity index no less than about 2.5;

wherein the mica particulate comprises no less than about 90 wt. % muscovite.

2. The mica particulate according to claim 1, having one or both of:

(a) a $d_{95}$, by laser, no greater than about 150 μm; and (b) a $d_{95}$, by sedigraph, no greater than about 30 μm.

3. The mica particulate according to claim 1, wherein:

(a) the BET specific surface area is from about 4.5 $m^2/g$ to about 50 $m^2/g$; or (b) the lamellarity index is from about 2.5 to about 6.5.

4. The mica particulate according to claim 1, having:

(a) a $d_{50}$, by laser, no greater than about 40 μm;

(b) a $d_{50}$, by sedigraph, no greater than about 6 μm;

(c) a Minolta Y whiteness no less than about 70; or (d) a PANACEA shape factor from about 100 to about 250.

5. A method for preparing the mica particulate according to claim 1, the method comprising classifying a ground mica material.

6. The method according to claim 5, comprising: (a) classifying the ground mica material using an air classifier operated with a peripheral speed of no less than about 25 m/s; or (b) classifying the ground mica material by sieving.

7. The method according to claim 5, wherein the method further comprises, prior to classification, grinding a mica feed material to produce the ground mica material, optionally wherein the grinding is a wet grinding.

8. The method according to claim 5, wherein the ground mica material has:

(a) a BET specific surface area less than about 5.0 $m^2/g$;

(b) a $d_{95}$, by sedigraph, from about 10 μm to about 100 μm;

(c) a $d_{75}$, by sedigraph, from about 5 μm to about 50 μm;

(d) a $d_{50}$, by sedigraph, from about 1 μm to about 20 μm;

(e) a $d_{25}$, by sedigraph, from about 1 μm to about 10 μm;

(f) a $d_{95}$, by laser, from about 30 μm to about 300 μm;

(g) a $d_{75}$, by laser, from about 20 μm to about 100 μm;

(h) a $d_{50}$, by laser, from about 10 μm to about 60 μm;

(i) a $d_{25}$, by laser, from about 5 μm to about 50 μm;

(j) a lamellarity index from about 2.5 to about 7.0;

(k) a Minolta Y whiteness no less than about 70; and/or (l) a shape factor no less than about 100.

9. A method comprising combining a polymer or polymer precursors with the mica particulate according to claim 1.

10. The mica particulate according to claim 1, having:

(a) a $d_{50}$, by laser from about 20 μm to about 40 μm;

(b) a $d_{50}$, by sedigraph from about 3.5 μm to about 6 μm;

(c) a Minolta Y whiteness from about 70 to about 88; and (d) a PANACEA shape factor from about 140 to about 180.

11. The mica particulate according to claim 10, having a BET specific surface area is from 5.0 $m^2/g$ to about 12 $m^2/g$; and a lamellarity index from about 4.0 to about 5.7.

12. A mica particulate according to claim 1, wherein:

(a) the BET specific surface area is from about 4.5 $m^2/g$ to about 50 $m^2/g$; and (b) the lamellarity index is from about 2.5 to about 6.5.

13. The mica particulate according to claim 1, having:

(a) a $d_{50}$, by laser, no greater than about 40 μm;

(b) a $d_{50}$, by sedigraph, no greater than about 6 μm;

(c) a Minolta Y whiteness no less than about 70; and (d) a PANACEA shape factor from about 100 to about 250.

* * * * *